(12) United States Patent
Fredenhagen

(10) Patent No.: US 9,943,803 B2
(45) Date of Patent: Apr. 17, 2018

(54) METHOD FOR OPERATING AN ADSORPTION DEVICE AND A CONTROL UNIT

(71) Applicant: KAESER KOMPRESSOREN SE, Coburg (DE)

(72) Inventor: Andreas Fredenhagen, Coburg (DE)

(73) Assignee: KAESER KOMPRESSOREN SE, Coburg (DE)

( * ) Notice: Subject to any disclaimer, the term of this patent is extended or adjusted under 35 U.S.C. 154(b) by 71 days.

(21) Appl. No.: 14/917,700

(22) PCT Filed: Sep. 4, 2014

(86) PCT No.: PCT/EP2014/068845
§ 371 (c)(1),
(2) Date: Mar. 9, 2016

(87) PCT Pub. No.: WO2015/032862
PCT Pub. Date: Mar. 12, 2015

(65) Prior Publication Data
US 2016/0214056 A1     Jul. 28, 2016

(30) Foreign Application Priority Data
Sep. 9, 2013 (EP) .................................. 13183511

(51) Int. Cl.
*B01D 53/06* (2006.01)
*B01D 53/26* (2006.01)
*B01D 53/04* (2006.01)

(52) U.S. Cl.
CPC ....... *B01D 53/261* (2013.01); *B01D 53/0454* (2013.01); *B01D 53/06* (2013.01); *B01D 2257/80* (2013.01); *B01D 2259/40086* (2013.01)

(58) Field of Classification Search
CPC .. B01D 53/0454; B01D 53/06; B01D 53/261; B01D 2257/80; B01D 2259/40086
(Continued)

(56) References Cited

U.S. PATENT DOCUMENTS 5,385,603 A    1/1995  Sienack
6,447,583 B1   9/2002  Thelen et al.
(Continued)

FOREIGN PATENT DOCUMENTS

CH    691349 A5    7/2001
EP    0566180 A1  10/1993
(Continued)

OTHER PUBLICATIONS

International Search Report for PCT/EP2014/068845 dated Mar. 4, 2015.
English Abstract of CH691349, Publication Date: Jul. 13, 2001.

*Primary Examiner* — Frank Lawrence
(74) *Attorney, Agent, or Firm* — Millen, White, Zelano & Branigan, P.C.; William Nixon

(57) ABSTRACT

In a method for operating an adsorption device to remove at least in part an adsorbable and/or condensable component from a gas flow. The adsorption device contains an adsorption material and is configured in such a way that the adsorption material is brought into contact with the gas flow in an operating region and can be regenerated in a regeneration region. In the case of an at least temporary interruption or discontinuation of transportation of the gas flow to provide an output gas flow, a follow-up operating phase is initiated, during which a portion of the adsorption material is moved out of the regeneration region.

31 Claims, 8 Drawing Sheets

(58) Field of Classification Search
USPC .................. 96/125; 95/107; 34/472, 473, 80
See application file for complete search history.

(56) References Cited

U.S. PATENT DOCUMENTS

| | | | |
|---|---|---|---|
| 6,527,836 B1 | 3/2003 | White, Jr. et al. | |
| 7,789,942 B2* | 9/2010 | Vanderstraeten | B01D 53/06 55/DIG. 17 |
| 8,349,054 B2 | 1/2013 | Fredenhagen et al. | |
| 2009/0007784 A1* | 1/2009 | Vanderstraeten | B01D 53/06 95/119 |
| 2009/0223236 A1* | 9/2009 | Call | F24F 3/1423 62/235.1 |
| 2011/0132191 A1 | 1/2011 | Fredenhagen et al. | |
| 2013/0000143 A1* | 1/2013 | Fux | F26B 21/083 34/474 |

FOREIGN PATENT DOCUMENTS

| | | |
|---|---|---|
| EP | 2332631 B1 | 11/2012 |
| WO | 0074819 A1 | 12/2000 |

* cited by examiner

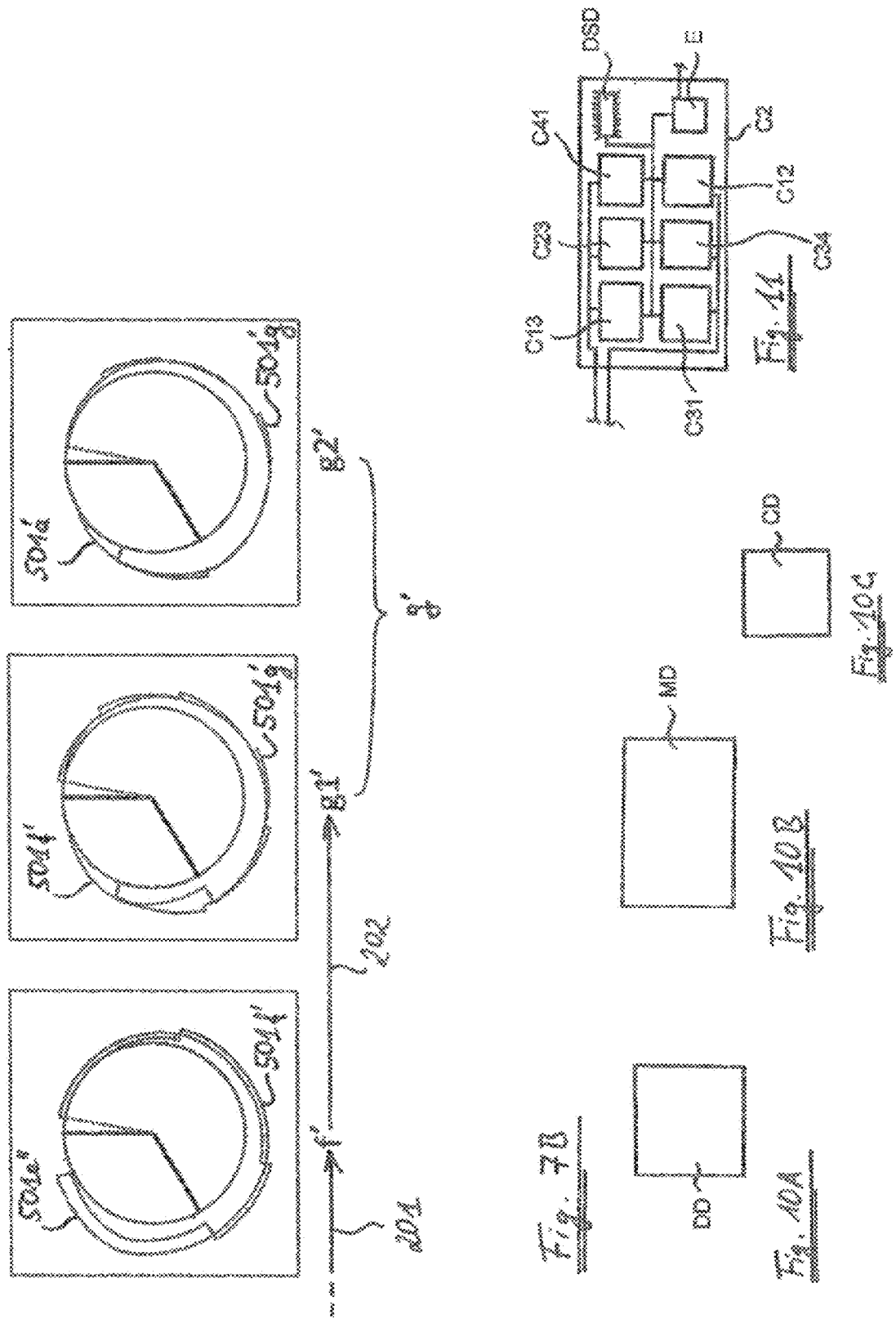

METHOD FOR OPERATING AN ADSORPTION DEVICE AND A CONTROL UNIT

FIELD OF THE INVENTION

The present invention relates to methods for operating an adsorption device. The invention further relates to a control unit for controlling an adsorption device for operation according to such methods.

TECHNICAL BACKGROUND

Although the invention can be used advantageously in various cases in which an adsorbable and/or condensable component of a gas flow is to be removed from said flow, or the concentration of the component in the gas flow is to at least be reduced, the invention and the problem addressed thereby are to be explained in greater detail below by way of example on the basis of drying compressed air, in other words, reducing the water concentration in the compressed air. It is understood that a similar problem can also occur when dehumidifying other gases, in particular other pressurised gases, such as nitrogen, natural gas, or gases from chemical production processes.

An adsorption drying device for drying an in particular compressed gas, in which the adsorption material is located in a rotating adsorption chamber, and an adsorption drying method, in conjunction with which said adsorption drying device can be used, are described for example in EP2332631 B1.

In an adsorption drying method of this type, an adsorption material, for example a silica gel, is used for adsorption. Adsorption materials of this type are able to pick up and bond, i.e. adsorb, relatively large amounts of water from a gas phase, such as compressed air. Adsorption materials which have adsorbed water can also release, i.e. desorb, said water back to the gas phase. The speed with which adsorption and desorption take place generally depends on the water concentration in the gas phase, on the loading of the adsorption material, i.e. the ratio of bound water mass to the mass of the adsorption material, and on the temperature. When the amounts of water adsorbed and desorbed per unit time are equal in size, and therefore the water concentration in the gas phase and the loading of the adsorption material do not change, this is referred to as adsorption equilibrium. The concentration in the gas phase is then the equilibrium concentration corresponding to the loading, the loading of the adsorption material is the equilibrium loading corresponding to the water concentration. If the loading of the adsorption material is less than the equilibrium loading which occurs at the current temperature and water concentration in the gas phase, the adsorption material can pick up water and thus dry the gas phase. If, however, the loading of the adsorption material is greater than the equilibrium loading, the adsorption material releases water to the gas phase.

The equilibrium loading of the adsorption material at a particular water concentration in the gas phase is lower, the higher the temperature is. Therefore, regeneration can be carried out using adsorption material loaded with water at high temperatures, i.e. the water can be released to the gas phase. As a result, after an intermediate cooling, the adsorption material is able to pick up water from the gas phase again.

In the case of the device described in EP2332631 B1, the adsorption material passes through three different sectors during one rotation. In a drying sector, a cool, moist compressed air flows through the adsorption material, and the adsorption material picks up moisture from said air (adsorption) so that the compressed air is dried. In a subsequent regeneration sector, hot compressed air flows through the adsorption material and warms it. As a result of the warming, the adsorption material releases moisture to the compressed air (desorption). After passing through the regeneration sector, the adsorption material has a low moisture load again and is thus regenerated with respect to moisture for the next pass through the drying sector. However, since the adsorption material is still hot after this regeneration, it is firstly moved through a cooling sector after the regeneration, in that dried, cool compressed air flows through said material and cools it. In the drying sector, the dry and cool adsorption material can then pick up moisture from the compressed air to be dried again.

It has been found that drying compressed air by means of the above-described adsorption drying device produces good results in particular with low pressure dew points in an output gas flow when the adsorption device is operated in stationary operation with continuous transportation of compressed air.

However, it would be desirable to improve the dehumidification yet further in cases where the adsorption device or a system in which the adsorption device is integrated is operated intermittently or very intermittently. A very intermittent operation of this type comes about for example when the transportation of compressed air, for example due to significant fluctuation in the compressed air requirement, is frequently interrupted and then resumed for relatively short intervals of time, to then be interrupted once again.

SUMMARY OF THE INVENTION

Against this background, the problem addressed by the present invention is thus that of creating improved methods for operating an adsorption device which, in particular in the case of intermittent transportation of a gas flow, such as of compressed air or another pressurised gas, allow improved removal of an adsorbable and/or condensable component, such as water vapour, from the gas flow by means of the adsorption device. Furthermore, a control unit that has been improved accordingly is to be indicated.

The problem is solved according to the invention by a first method having the features disclosed herein and/or by a second method having the features also disclosed herein and/or by a control unit having the features disclosed herein.

In the first and second methods, which are proposed according to the invention, for operating an adsorption device to remove an adsorbable and/or condensable component at least in part from a gas flow, the adsorption device contains an adsorption material. The adsorption device is additionally configured in such a way that the adsorption material can be brought into contact with the gas flow in an operating region of the adsorption device to remove the component, and that the adsorption material can be regenerated in a regeneration region of the adsorption device by means of desorption of the component. For this purpose, in a load operating phase of the adsorption device, consecutive portions of the adsorption material can be moved continuously through the operating region and the regeneration region relative to the operating region and the regeneration region in a recurring manner.

In a first method according to the invention, the following method steps are provided:
the gas flow is transported through the adsorption device in such a manner that the component is removed from the gas flow at least in part, and an output gas flow, from which the component is removed at least in part, is provided; and in the case of an at least temporary interruption or discontinuation of the transportation of the gas flow to provide the output gas flow, a follow-up operating phase of the adsorption device is initiated, wherein during the follow-up operating phase, a portion of the adsorption material is moved out of the regeneration region by means of a movement relative to the regeneration region.

It should be noted that the initiation of the follow-up operating phase in the case of the at least temporary interruption or discontinuation of the transportation, as has been specified above, does not necessarily have to take place immediately when the transportation of the gas flow stops, but rather a time lag in terms of an operating intermission can occur between the moment when the transportation is interrupted or discontinued, and the moment when the follow-up operating phase starts.

The second proposed method for operating an adsorption device has the following method steps:

when a transportation of the gas flow by the adsorption device is started or resumed in that the component is removed at least in part from the gas flow, and an output gas flow, from which the component is removed at least in part, is provided, the adsorption device is firstly operated in a warm-up operating phase, wherein during the warm-up operating phase, the adsorption material is stationary relative to the operating region and the regeneration region; and after the warm-up operating phase, a load operating phase is initiated, wherein during the load operating phase, consecutive portions of the adsorption material can be moved continuously through the operating region and the regeneration region relative to the operating region and the regeneration region in a recurring manner.

In the second method according to the invention, the load operating phase is initiated depending on whether operating conditions are present which allow a sufficient regeneration of the adsorption material in the regeneration region. Alternatively or additionally thereto, in the second method according to the invention, the load operating phase is initiated when a measurement for the movement which the adsorption material would have carried out relative to the operating region and the regeneration region during the duration of the warm-up operating phase if the adsorption device had been operated in a load operating phase instead of in the warm-up operating phase, exceeds a specified value.

The invention further proposes a control unit which is configured to control an adsorption device to remove an adsorbable and/or condensable component at least in part from a gas flow. The adsorption device to be controlled contains an adsorption material and is configured in such a way that the adsorption material can be brought into contact with the gas flow in an operating region of the adsorption device to remove the component, and that the adsorption material can be regenerated in a regeneration region of the adsorption device by means of desorption of the component, and that for this purpose, in a load operating phase of the adsorption device, consecutive portions of the adsorption material can be moved continuously through the operating region and the regeneration region relative to the operating region and the regeneration region in a recurring manner.

The control unit according to the invention is configured to control the adsorption device in particular for an operation of said device according to the first method. The control unit comprises control means for initiating a follow-up operating phase of the adsorption device and for controlling the adsorption device in such a way that, during the follow-up operating phase, a portion of the adsorption material is moved out of the regeneration region by a movement relative to the regeneration region is a transportation of the gas flow through the adsorption device, such that the component is removed at least in part from the gas flow, and an output gas flow, from which the component is removed at least in part, is provided, is at least temporarily interrupted or discontinued.

The finding on which the invention is based consists in the fact that, in the case of intermittent transportation of the gas flow, it can be useful if a movement of the adsorption material through the operating and regeneration region does not start and/or end at exactly the same times as the transportation of the gas flow which is used to provide the output gas flow, but rather it can be beneficial, during a warm-up operating phase, to prevent the movement of the adsorption material for a period to be determined and/or to continue the movement of the adsorption material during a follow-up operating phase.

With a warm-up operating phase, regeneration conditions in the regeneration region, which change over time from the start or resumption of the transportation for providing the output flow, in particular which improve over time and approach the stationary state only after a certain amount of time, can be taken into consideration. In particular, the warm-up operating phase makes it possible—even when the adsorption material in a portion located in the regeneration region was already regenerated to the lowest possible load prior to an interruption of the transportation—to prevent initially unfavourable regeneration conditions in the regeneration region at the start or resumption of the transportation from making the loading of the adsorption material with the component to be removed worse again, and then adsorption material having an unfavourably high load from arriving in the operating region. The second proposed method therefore provides making the initiation of a movement of the adsorption material relative to the regeneration region and the operating region dependent on the presence of operating conditions which are suitable for a sufficient regeneration and/or on a measurement for a movement of the adsorption material which is "omitted" in the warm-up operating phase.

The follow-up operating phase which is provided in the first method makes it possible to move adsorption material which has already been regenerated at least in part, preferably substantially or fully regenerated adsorption material, out of the regeneration region, and in particular makes it possible to simultaneously move a portion of the adsorption material in which the adsorption material can be heavily loaded with the component to be removed, out of the operating region. In particular in combination with a warm-up operating phase, by means of the first method, in the case of frequently interrupted generation of compressed air as a result of accumulation of the component in a portion of the adsorption material which is located in the operating region, it is possible to prevent the component from being removed from the gas flow less effectively over time. The follow-up operating phase can thus have a favourable effect on the loading of the adsorption material which is present, viewed across the operating region, when the transportation is resumed.

It is thus clear that the first and second methods according to the invention can be useful in particular when a component is to be removed from the gas flow in the case of intermittent transportation or provision of a gas flow in which transportation phases alternate with stationary phases. The methods according to the invention are thus suitable for operating an adsorption device which is to be used when covering peaks in demand—for example peaks in the compressed air requirement in a manufacturing plant or a manufacturing company. By means of the methods according to the invention, it is also possible to operate adsorption devices which are regularly operated in continuous stationary operation—for example to cover basic requirements—and are only occasionally used to cover peaks in demand.

The advantages of the first method can also be achieved by means of the proposed control unit, which is configured in particular to control the adsorption device for operation according to the first method.

The term "initiating" an operating phase, i.e. for example a load operating phase or a follow-up operating phase, should be understood in the present case to mean that the phase in question is started or, in other words, begun.

In addition, it is explicitly noted that relative movements of the adsorption material on the one hand, and of the operating and regeneration regions on the other hand, in particular the above-mentioned movement of the portions of the adsorption material relative to the operating and regeneration region, is achieved by moving the portions of the adsorption material through the operating and regeneration region, and also the relative movement of a portion of the adsorption material, by means of which said portion is moved out of the regeneration region in the follow-up operating phase, can be achieved not only by moving the adsorption material whilst the operating region and the regeneration region are stationary with respect to an environment in which the adsorption device is operated. Instead, in order to achieve the relative movements, the adsorption material can be stationary relative to the environment, whilst the operating region and regeneration region move with respect to the environment. In another variant, both the operating and regeneration region and the adsorption material could move in a suitable manner with respect to the environment.

Advantageous developments, embodiments and improvements of the invention can be found in the dependent claims and in the description with reference to the figures. Embodiments and developments of the two methods according to the invention and of the control unit are explained in the following.

It should firstly be noted that, in the context of the present application, the term "operating data" should be understood to mean in particular calculated, measured or otherwise captured or detected variables which can be captured or measured during a current operating phase or in an operating intermission of the adsorption device or a system in which the adsorption device is used, or which can be detected or estimated for the respective operating phases or operating intermissions in other ways, for example by means of a computer. In this case, the "operating data" should represent information which is associated with the respective operating phases or operating intermissions or part thereof, wherein said information can vary over the operating time, in particular over the operating phase or operating intermission. Alternatively, the information can also be time-averaged over the respective operating phases or operating intermissions.

In order to make the terminology clearer, the term "operating data" in the present case should also be understood in such a way that it can include a single value of a variable, a sequence of a plurality of values of said variable, single values of a plurality of different variables, or sequences of a plurality of values of a plurality of different variables in combination.

In contrast, "predetermined parameters" in the present case should be understood to mean in particular variables of the type which result for example from the construction of the adsorption device or the system, the dimensions thereof, the measurements or geometric properties thereof, or the choice of materials of the individual components, or which represent for example externally specified reference variables. Predetermined parameters of this type could also be physical and/or chemical properties of the adsorption material used.

In one embodiment, the follow-up operating phase is initiated
- on the basis of operating data of the adsorption device which are associated with one or more operating phases and/or operating intermissions of the adsorption device and/or
- on the basis of operating data of a system in which the adsorption device is used and/or
- on the basis of a duration of one or more operating phases and/or operating intermissions of the adsorption device and/or
- on the basis of one or more predetermined parameters of the adsorption device and/or of the adsorption material, or, alternatively thereto, in the case of the at least temporary interruption or discontinuation of the transportation of the gas flow to provide the output gas flow independently of such operating data and/or durations and/or predetermined parameters. Initiating the follow-up operating phase independently in particular of operating data of the adsorption device or the system in which said device is used can be carried out comparatively easily and can be useful when it is known from the outset that the transportation of the gas flow is interrupted and resumed in a relatively regular rhythm, the cycle of which is known for example more or less precisely. However, when the transportation varies in an irregular manner which cannot be foreseen from the outset, it can be useful to take into consideration operating data, durations of operating phases and/or operating intermissions, and preferably additionally predetermined parameters of the adsorption device and/or of the adsorption material. In this way, it is possible to dynamically determine whether, in the case of a given interruption of the transportation, a follow-up operating phase is to be triggered or—for example in the case of stationary operation prior to the interruption over a relatively long period of time, i.e. an extended load operating phase—the follow-up operating phase can possibly be omitted.

In a preferred embodiment, the follow-up operating phase is initiated immediately after the at least temporary interruption or discontinuation of the transportation of the gas flow for providing the output gas flow. This is advantageous in the case of intermittent operation, since in this way it is possible to prevent the transportation of the gas flow for providing the output gas flow from being resumed before the follow-up operating phase is complete.

In an alternative embodiment, the follow-up operating phase is initiated with a delay between the time of the at least temporary interruption or discontinuation of the transportation of the gas flow for providing the output gas flow and the time of the initiation of the follow-up operating phase, the delay preferably having a duration of at most ten minutes, more preferably a duration of at most five minutes.

According to one embodiment, no or substantially no regeneration of the adsorption material takes place in the regeneration region whilst the transportation of the gas flow for providing the output gas flow is at least temporarily interrupted or discontinued. In addition to the already mentioned favourable effect of the loading of the adsorption material which is present across the operating region when the transportation is resumed, in particular efficient regeneration can be achieved by means of the follow-up operating phase when the transportation is resumed by moving heavily loaded adsorption material out of the operating region. In this embodiment, it is not necessary to carry out additional work to regenerate the adsorption material during the temporary interruption or discontinuation of the transportation of the gas flow.

In one embodiment, the adsorption device is configured in such a way that, relative to an environment in which the adsorption device is operated, the operating region and the regeneration region are designed to be stationary, and the adsorption material is designed to be movable. This can contribute to a comparatively simple construction of the device.

In one embodiment, during the transportation of the gas flow for providing the output gas flow, the gas flow is compressed by an input compressor which is connected upstream of the adsorption device on the input side. For example, the input compressor can be a single-stage or multi-stage, dry-running screw compressor and/or a turbo compressor. The heat generated during the compression can then be used particularly simply and efficiently for the regeneration of the adsorption material.

In one development, during the transportation of the gas flow for providing the output gas flow, the regeneration in the regeneration region takes place at a temperature which is increased by comparison with the operating region. In this way, an effective regeneration of the adsorption material can be achieved.

In one embodiment, during the transportation of the gas flow for providing the output gas flow, the regeneration takes place in that a regeneration gas flow is brought into contact with the adsorption material in the regeneration region. This embodiment can contribute to effectively discharging the desorbed component from the adsorption material during the regeneration process.

According to a preferred and advantageous embodiment, it is provided that during the transportation of the gas flow for providing the output gas flow, a full flow regeneration of the adsorption material takes place, and that for this purpose, the gas flow as a full flow forms the regeneration gas flow, the regeneration gas flow, after leaving the regeneration region, is supplied to the operating region and comes into contact with the adsorption material there for the removal of the component at least in part. In this case, the regeneration gas flow can be supplied to the operating region separately or together with another gas flow. In the case of full flow generation, a large amount of regeneration heat is available for the regeneration of the adsorption material. In this case, the available regeneration heat can be well above the requirement. The regeneration capacity in the regeneration region, which is high in this embodiment, can contribute to improved operational safety over a wide range of operating conditions.

In another embodiment, during the transportation of the gas flow for providing the output gas flow, the regeneration gas flow, after it has left the regeneration region and before it enters the operating region, is cooled by means of a cooler, and at least part of the component is condensed and separated as a condensate. In this case, the regeneration gas flow can be cooled separately or together with another gas flow, and the component can be separated from the regeneration gas flow separately or from a combination of the regeneration gas flow with another gas flow. In this way, by means of condensation, the gas flow used for the regeneration can be rid of at least part of the present component, and can also be cooled to a temperature which is favourable for the additional removal of the component by means of the adsorption material in the operating region.

Preferably, the input compressor comprises a compressor/condenser unit in particular having a cooler and a condenser/separator unit. The compressor/condenser unit can further preferably form at least part of the cooler which cools the regeneration gas flow after it has left the regeneration region and/or of a subsequent condensate separator for separating the component as a condensate. In this way, costs can be reduced, in particular the maintenance and installation costs can be reduced.

In one embodiment, the pressure of the regeneration gas flow can be increased by means of a pressure booster before the regeneration gas flow enters the operating region. In particular in this case, the pressure of the regeneration gas flow can be increased separately, or the pressure of a gas flow which is formed from a combination of the regeneration gas flow with another gas flow can be increased by means of the pressure booster. In this way, for example the formation of undesirable leakage flows can be prevented using simple means. The pressure booster can be in particular motor-driven and can be in the form of for example a compressor or a fan or a pump. However, in other variants of this embodiment, the pressure booster can also be configured in such a way that it has no motor drive, for example configured as an ejector.

In embodiments, the additional gas flow can be a cooling gas flow which has in particular a low mass flow by comparison with the regeneration gas flow.

In one embodiment, the pressure is increased by means of the pressure booster after the separation of the condensate. Since the temperature of the gas can also be increased by means of the pressure booster, any droplets of the component which are still present can advantageously evaporate.

In one embodiment, the pressure booster is in the form of a mechanical compressor, in particular a compressor and/or a fan and/or a pump and/or a side-channel compressor and/or a turbo compressor, for example a radial compressor. The fan, the pump, the side-channel compressor or the turbo compressor can be for example electrically driven.

In one embodiment, the adsorption device is firstly operated in a warm-up operating phase when the transportation of the gas flow for providing the output gas flow is started or resumed. During the warm-up operating phase, the gas flow for providing the output gas flow is transported, and the adsorption material is stationary relative to the operating region and the regeneration region. The advantages of the warm-up operating phase have already been mentioned. The combination of warm-up and follow-up operating phase, as provided by a corresponding embodiment of the first method, makes it possible firstly for the adsorption material which leaves the regeneration region to primarily also be regenerated as effectively as possible in the upper region thereof. Secondly, it can advantageously be achieved that, even in the case of very intermittent transportation with short transportation intervals, in which the stationary adsorption material in the operating region frequently comes into contact with the gas flow and is loaded with the component, when the material passes through the operating region, it does not have to pick up substantially greater amounts of the component to be removed than in stationary operation.

According to a development, after the warm-up operating phase, a load operating phase is initiated, during which consecutive portions of the adsorption material can be moved continuously through the operating region and the regeneration region relative to the operating region and the regeneration region in a recurring manner.

According to a variant of this development, it can be provided that the initiation of the load operating phase after the warm-up operating phase stops if the transportation of the gas flow for providing the output gas flow is at least temporarily interrupted or discontinued during the current warm-up operating phase.

In another embodiment, the duration of the warm-up operating phase, taken from the start or the resumption of the transportation of the gas flow for providing the output gas flow until the initiation of the load operating phase, is variable. The warm-up operating phase can thus be adapted to the operating conditions that are present in each case. However, in an alternative embodiment, a fixed duration of the warm-up operating phase can also be specified instead.

In one embodiment, the duration of the warm-up operating phase, taken from the start or the resumption of the transportation of the gas flow for providing the output gas flow until the initiation of the load operating phase, is determined
  taking into consideration operating data of the adsorption device which are associated with a current operating phase and/or a previous operating phase and/or operating intermission or a plurality of previous operating phases and/or operating intermissions of the adsorption device, and/or
  taking into consideration operating data of a system in which the adsorption device is used, and/or
  taking into consideration a duration of one or more previous operating phases and/or operating intermissions of the adsorption device, and/or
  taking into consideration one or more predetermined parameters of the adsorption device and/or of the adsorption material.

This means that the above-mentioned operating data and/or durations and/or predetermined parameters, optionally together with other variables, find their way into the predetermined duration of the warm-up operating phase. This can contribute to selecting the warm-up operating phase so as to be sufficiently, but not unnecessarily long under the given operating conditions, and to optimising the duration of said operating phase.

In one embodiment, the operating data for determining the duration of the warm-up operating phase during each operating phase and/or operating intermission are captured and/or measured by means of one or more measuring or sensor devices. Additionally or alternatively, according to this embodiment, the operating data for each operating phase and/or operating intermission can be calculated, or can be detected or estimated in another suitable manner.

In one embodiment, the duration of the warm-up operating phase is determined taking into consideration operating data of the adsorption device which are captured or measured during a current warm-up operating phase and/or during one or more previous warm-up operating phases and/or during one or more previous load operating phases, or which are calculated, or are detected or estimated in another suitable manner, for each operating phase. Whereas no transportation of the gas flow takes place in operating intermissions, the gas flow is transported in warm-up operating phases and load operating phases, which transportation, for example in the case of regeneration by the hot full flow or also in the case of regeneration by means of a hot bypass flow which is branched off after an input compressor, leads to a warm-up of the adsorption material in the regeneration region. Operating data for warm-up and operating phases can therefore be particularly useful for generating a statement about the preferred duration of a current warm-up operating phase.

In one embodiment, the duration of the warm-up operating phase is determined taking into consideration a duration of one or more previous warm-up operating phases and/or a duration of one or more previous load operating phases. In the case of regeneration by means of a hot regeneration gas flow, in particular in the case of full flow regeneration, such durations can be for example taken into consideration when temperatures of the adsorption material or the components of the adsorption device or the system in which the adsorption device is used are to be estimated.

In one embodiment, in order to determine the duration of the warm-up operating phase, it is established whether operating conditions are present which allow sufficient regeneration of the adsorption material in the regeneration region. In the case of this embodiment, the result of this establishment is taken into consideration when determining the duration of the warm-up operating phase. The establishment preferably takes place during the current warm-up operating phase, in particular continuously or periodically. This can contribute to ending the warm-up operating phase at the right moment, i.e. when the operating conditions prevailing in the regeneration region have become sufficiently favourable for regeneration. As a result, the warm-up operating phase can advantageously be restricted to the necessary and sufficient amount, and an unnecessary increase in the loading of the adsorption material in the regeneration region can be prevented.

In one embodiment, after the warm-up operating phase, a load operating phase is initiated as soon as it is established that operating conditions are present which allow a regeneration which, during the transportation of the gas flow in the load operating phase, is sufficient for falling below a predetermined threshold for the concentration of the component in the output gas flow.

In one development, the establishment of whether operating conditions are present which allow sufficient regeneration of the adsorption material in the regeneration region take place
  on the basis of operating data of the adsorption device which are associated with one or more operating phases and/or operating intermissions of the adsorption device, and/or
  on the basis of operating data of a system in which the adsorption device is used, and/or
  on the basis of a duration of one or more operating phases and/or operating intermissions of the adsorption device, and/or
on the basis of one or more predetermined parameters of the adsorption device and/or of the adsorption material. Initiating the load operating phase after the warm-up operating phase on the basis of operating data, durations of operating phases and/or operating intermissions and/or predetermined parameters of the adsorption device and/or of the adsorption material makes it possible to initiate the movement of the adsorption material at the optimum moment in accordance with each operating situation.

In one embodiment of the first or second method, in order to establish whether operating conditions are present which allow sufficient regeneration of the adsorption material in the regeneration region, one or more or all of the following operating data are taken into consideration:

- a mass flow of a transported gas flow or a rate of change over time of said mass flow, in particular of the input mass flow;
- a mass flow of the regeneration gas flow or a rate of change over time of said mass flow;
- a temperature of the regeneration gas flow before the regeneration gas flow comes into contact with the adsorption material in the regeneration region, or a rate of change over time of said temperature, in particular a temperature of the regeneration gas flow before said gas flow enters the regeneration region, or the rate of change over time of said temperature;
- a temperature of a regeneration gas flow after the regeneration gas flow comes into contact with the adsorption material in the regeneration region, or a rate of change over time of said temperature, in particular a temperature of the regeneration gas flow after said gas flow leaves the regeneration region, or the rate of change over time of said temperature;
- a compression pressure, to which the input gas flow is compressed by an input compressor by means of which the input gas flow is provided, or a rate of change over time of said pressure;
- one or more additional temperatures of a component of an input compressor by means of which the input gas flow is provided, or one or more temperatures of the input gas flow inside the input compressor, in particular an intake air temperature of a last compression stage of the input compressor and/or a cooling water temperature, or a rate of change over time of said temperature or said temperatures.

In this case, the operating data can be captured and/or measured respectively during one or more operating phases and/or operating intermissions of the adsorption device, and/or calculated for each operating phase and/or operating intermission, or determined or estimated in another suitable manner. In particular, the above-mentioned operating data can be measured or detected during the current warm-up operating phase. The operating data to be taken into consideration can then be compared for example in each case with an associated fixed or associated automatically or manually adjustable threshold value. A comparison of the rates of change over time with an associated threshold value can be advantageous, since the end of the warm-up operating phase can thus be made dependent on whether or not the conditions for regeneration substantially improve as time goes on.

In an advantageous embodiment, in order to establish whether operating conditions are present which allow sufficient regeneration of the adsorption material in the regeneration region, a temperature of the regeneration gas flow before the regeneration gas flow comes into contact with the adsorption material in the regeneration region can be compared with a threshold value which can be automatically or manually adapted to the operating conditions. In this way, it is possible to prevent the threshold value from not being reached or being reached too late in certain operating conditions, or to prevent it from being reached too early, and the warm-up operating phase from being ended even before sufficient regeneration conditions have been reached.

According to one development, the current warm-up operating phase is ended if the duration of the current warm-up operating phase, from the time that the transportation of the gas flow for providing the output gas flow starts or resumes, exceeds a value which
- is fixed or which is determined
- taking into consideration
  - an amount of gas or a mass flow of the gas which is transported as a gas flow in the current warm-up operating phase and/or in one or more previous warm-up operating phases and/or in one or more previous load operating phases, and/or
  - taking into consideration a time which has elapsed since the end of the last previous warm-up operating phase or load operating phase or follow-up operating phase.

In this way, it can advantageously be ensured that the warm-up operating phase does not last too long, but rather is ended after a delay time which is fixed or is adapted to the operating conditions, in particular when the warm-up operating phase has not yet been ended on the basis of other criteria.

In one embodiment, a cooling region is provided in addition to the operating region and the regeneration region. In this case, the adsorption device is configured in such a way that adsorption material regenerated in the load operating phase, after it has been moved out of the regeneration region and before it has been moved back into the operating region, can be cooled to a temperature which is suitable for the removal of the component at least in part from the gas flow. According to this embodiment, during the follow-up operating phase, the portion of the adsorption material which is moved out of the regeneration region during the follow-up operating phase is moved into the cooling region and/or moved through the cooling region at least in part by means of a movement of the adsorption material relative to the cooling region, and is cooled there. The cooling makes it possible to lower the temperature of the adsorption material—which temperature the adsorption material can reach as a result of the regeneration gas flow which is preferably hot for effective desorption in the regeneration region—to a value which is favourable for the adsorption of the component from the gas phase in the operating region. Two or more cooling regions can also be provided. It should further be noted that the relative movement can be achieved not only by moving the adsorption material relative to a stationary cooling region, but also by moving the cooling region relative to a stationary adsorption material.

In one embodiment, the cooling in the follow-up operating phase takes place in that, during the follow-up operating phase, a cooling gas flow is brought about by means of a device which can be controlled independently of the transportation of the gas flow for providing the output gas flow, in particular by means of a compressor or a fan or a pump or a controllable valve. In this case, the cooling gas flow is brought into contact with the adsorption material in the cooling region for the cooling of said material. In this embodiment, the cooling gas flow can advantageously be controlled and for example adapted to the desired lower temperature and/or to the speed at which the adsorption material is moved out of the regeneration region.

In one development, during the follow-up operating phase, the cooling gas flow is brought about by mean of the pressure booster, wherein the pressure booster forms the controllable device. Preferably, in this case, a transportation capacity of the pressure booster, which is defined for example as the amount transported per unit time, can be set to a measurement which is suitable for bringing about a sufficient cooling gas flow. This setting can take place for example when the follow-up operating phase is initiated, or during the follow-up operating phase. In particular, it can be provided that the transportation capacity of the pressure booster is reduced with respect to the transportation capacity thereof in the previous load operating phase. By using the pressure booster to maintain the cooling gas flow in the follow-up operating phase, another, additional transportation means is advantageously not necessary.

In one embodiment, the cooling in the follow-up operating phase is achieved in that, during the follow-up operating phase, a controlled discharge of part of a compressed gas, which is present in a container or supply network which is connected to the adsorption device on the output side, takes place. In this case, the discharge is carried out in that the part of the gas, as a cooling gas flow, is brought into contact with the adsorption material in the cooling region for the cooling of said material and then escapes into a region having a lower pressure, for example into the atmosphere surrounding the adsorption device. This can be achieved in particular in that a controllable valve, for example a solenoid valve, is provided as a controllable device, which is controlled for the discharge. This can be useful for example when the pressure booster is not available. In addition, this embodiment can be advantageous when the regeneration takes place in the bypass flow, and the regeneration gas flow in this case is sucked in for example by means of an ejector.

In a preferred embodiment, during the follow-up operating phase, a portion of the adsorption material is moved out of the operating region and moved into the regeneration region. This preferably takes place at the same time as the portion of the adsorption material which is to be moved out of the regeneration region in the follow-up operation is moved out. In particular, in this embodiment, the portion which is moved out of the operating region is as large as the portion of the adsorption material which is moved out of the regeneration region during the follow-up operating phase. A follow-up operation of this type can be carried out in a very simple manner.

In one embodiment, the operating data, on the basis of which the follow-up operating phase is initiated, are captured and/or measured during each operating phase and/or operating intermission by means of one or more measuring or sensor devices, and/or the operating data are calculated, or are detected or estimated in another suitable manner, for each operating phase and/or operating intermission.

In one development, a size of the portion of the adsorption material which is moved out of the regeneration region during the follow-up operating phase is no more than two thirds of a size of the regeneration region. This can contribute to ensuring that the adsorption material in the portion which is moved out is sufficiently regenerated.

In another embodiment, a duration of the follow-up operating phase and/or a size of the portion of the adsorption material which is to be moved out of the regeneration region in the follow-up operating phase is
 fixed or is determined
  on the basis of operating data of the adsorption device which are associated with one or more operating phases and/or operating intermissions of the adsorption device and/or
  on the basis of operating data of a system in which the adsorption device is used and/or
  on the basis of a duration of one or more operating phases and/or operating intermissions of the adsorption device and/or
  on the basis of one or more predetermined parameters of the adsorption device and/or of the adsorption material.

A fixed duration of the follow-up operating phase can be achieved in a simple manner and could be useful for example if it is known from the outset that the transportation of the gas flow is interrupted and resumed in a regular rhythm with a known cycle. If the transportation of the gas flow varies in an initially unknown, irregular manner, then, by means of the operating data, the duration of operating phases and/or operating intermissions, for example in conjunction with the predetermined parameters, can be detected, as the duration of the follow-up operating phase and/or the size of the portion which is to be moved out is advantageously to be selected so as to ensure the proper functionality of the adsorption material in the operating region and to prevent accumulation of the component in the adsorption material.

In one embodiment, the operating data for determining the duration of the follow-up operating phase and/or the size of the portion of the adsorption material which is to be moved out of the regeneration region during the follow-up operating phase are captured and/or measured during each operating phase and/or operating intermission by means of one or more measuring or sensor devices, and/or the operating data are calculated, or are detected or estimated in another suitable manner, for each operating phase and/or operating intermission.

In one embodiment, when determining a duration of the follow-up operating phase and/or a size of the portion of the adsorption material which is to be moved out of the regeneration region in the follow-up operating phase, a measurement for the movement which the adsorption material would have carried out relative to the operating region and the regeneration region during the duration of the warm-up operating phase, in particular of the last warm-up operating phase prior to the follow-up operating phase, if the adsorption device had been operated in a load operating phase instead of in the warm-up operating phase, is taken into consideration. By thus taking into consideration the movement of the adsorption material which is "omitted" in the warm-up operating phase, the adsorption material is prevented from having to pick up substantially larger amounts of the component in the operating region than in stationary operation, i.e. prolonged load operation, even in the case of short transportation intervals and frequent contact between the gas flow and the stationary adsorption material in the operating region. In stationary operation of this type which is used here for comparison, a continuous movement of the adsorption material is preferably adjusted in such a way that the adsorption material picks up only a specified, limited amount of the component per passage through the operating region.

In a preferred embodiment, the size of the portion of the adsorption material which is to be moved out of the regeneration region in the follow-up operation corresponds to the size of a portion of the adsorption material which would have been moved out of the regeneration region if a load operating phase had been initiated straight away instead of the warm-up operating phase at the start or resumption of the transportation of the gas flow for providing the output gas flow.

In one embodiment, the size of a portion of the adsorption material which would have been moved out of the regeneration region if a load operating phase had been initiated straight away instead of the warm-up operating phase at the start or resumption of the transportation of the gas flow for providing the output gas flow, is detected, in particular calculated, during said warm-up operating phase or after said phase. In particular, in this embodiment, the size detected in this manner can be stored and, in the case of the at least temporary interruption or discontinuation of the transportation of the gas flow for providing the output gas flow, used when determining the duration of the follow-up operating phase and/or the size of the portion which is to be moved out of the regeneration region in the follow-up operating phase. In this way, advantageously at the end of the warm-up operating phase, the variables defining the course of the follow-up operating phase can be determined and later retrieved.

In one embodiment, the initiation of the follow-up operating phase and/or the determination of a duration of the follow-up operating phase and/or a size of the portion of the adsorption material which is to be moved out of the regeneration region in the follow-up operating phase takes place taking into consideration one or more or all of the following operating data:

a duration of a current and/or previous load operating phase and/or a plurality of previous load operating phases;

a duration of a current and/or previous warm-up operating phase and/or a plurality of previous warm-up operating phases;

an amount of gas which is transported during a current and/or previous load operating phase and/or a plurality of previous load operating phases;

an amount of gas which is transported during a current and/or previous warm-up operating phase and/or a plurality of previous warm-up operating phases;

a gas mass flow which is transported during a current and/or previous load operating phase and/or a plurality of previous load operating phases;

a gas mass flow which is transported during a current and/or previous warm-up operating phase and/or a plurality of previous warm-up operating phases;

an amount of gas which is brought into contact with the adsorption material in the regeneration region as a regeneration gas flow during a current and/or previous load operating phase and/or a plurality of previous load operating phases;

an amount of gas which is brought into contact with the adsorption material in the regeneration region as a regeneration gas flow during a current and/or previous warm-up operating phase and/or a plurality of previous warm-up operating phases;

a mass flow of the regeneration gas flow which is present in the regeneration region during a current and/or previous load operating phase and/or a plurality of previous load operating phases;

a mass flow of the regeneration gas flow which is present in the regeneration region during a current and/or previous warm-up operating phase and/or a plurality of previous warm-up operating phases;

a pressure in the gas flow in a current and/or previous load operating phase and/or a plurality of previous load operating phases;

a pressure in the gas flow in a current and/or previous warm-up operating phase and/or a plurality of previous warm-up operating phases;

one or more temperatures of the transported gas flow, in particular an inlet temperature prior to entry into the operating region, in a current and/or previous load operating phase and/or a plurality of previous load operating phases;

one or more temperatures of the transported gas flow, in particular an inlet temperature prior to entry into the operating region, in a current and/or previous warm-up operating phase and/or a plurality of previous warm-up operating phases;

a concentration of the component in the gas flow in a current and/or previous load operating phase and/or a plurality of previous load operating phases, in particular upstream of the adsorption device;

a concentration of the component in the gas flow in a current and/or previous warm-up operating phase and/or a plurality of previous warm-up operating phases, in particular upstream of the adsorption device;

a concentration of the component in the output gas flow in a current and/or previous load operating phase and/or a plurality of previous load operating phases;

a concentration of the component in the output gas flow in a current and/or previous warm-up operating phase and/or a plurality of previous warm-up operating phases.

In this case, the operating data above can be captured and/or measured respectively during one or more operating phases of the adsorption device, and/or calculated for each operating phase, or determined or estimated in another suitable manner. The operating data to be taken into consideration can then be compared for example in each case with an associated fixed or associated automatically or manually adjustable threshold value.

In a preferred development, the initiation of the follow-up operating phase and/or the determination of a duration of the follow-up operating phase and/or a size of the portion of the adsorption material which is to be moved out of the regeneration region in the follow-up operating phase takes place taking into consideration operating data which are detected for the last warm-up operating phase prior to the follow-up operating phase and/or taking into consideration operating data which are detected for the load operating phase immediately prior to the follow-up operating phase.

In one embodiment, when determining the duration of the follow-up operating phase and/or the size of the portion of the adsorption material which is to be moved out of the regeneration region in the follow-up operating phase, operating data are taken into consideration which represent a measurement for the extent to which the adsorption material is regenerated in a portion of the adsorption material, in particular in the portion which is to be moved out, and/or which represent a measurement for loading of the adsorption material in a portion of the adsorption material, in particular in the portion which is to be moved out, in particular a spatially averaged loading or an estimated value thereof or local loading in a predetermined part of the portion.

In this case, these operating data can also be captured and/or measured respectively during one or more operating phases and/or operating intermissions of the adsorption device, and/or calculated for each operating phase and/or operating intermission, or determined or estimated in another suitable manner. For example, these operating data could be detected for a time at which a discontinuation or interruption of the transportation of the gas flow is requested. The operating data to be taken into consideration can then be compared for example in each case with an associated fixed or associated automatically or manually adjustable threshold value. A measurement for the loading and/or a measurement for the regeneration which has taken place can give direct information about the current condition of the adsorption material, and this can make it possible to adjust the follow-up operating phase as precisely as possible.

In one embodiment, the initiation of the follow-up operating phase and/or the determination of a duration of the follow-up operating phase and/or the determination of a size of the portion of the adsorption material which is to be moved out of the regeneration region in the follow-up operating phase takes place taking into consideration the dimensions of the operating region and the regeneration region. When a cooling region is present, in this case the dimensions of the cooling region are additionally preferably also taken into consideration. Alternatively or additionally thereto, ratios of the dimensions of said regions—the operating region, the regeneration region and optionally the cooling region—to one another are taken into consideration.

In one embodiment, the adsorption device is an adsorption drying device for drying compressed gas, in particular for drying compressed air, wherein the operating region of the adsorption device is a drying region, inside which moisture is extracted from the compressed gas.

In a preferred embodiment, the adsorption device comprises a rotatable adsorption chamber which can rotate about an axis and contains the adsorption material. In this case, during the load operating phase, portions of the adsorption material can be moved continuously through the operating region and the regeneration region in a recurring manner by the rotation. In this embodiment, the portion of the adsorption material is moved out of the regeneration region in the follow-up operating phase by rotating the adsorption chamber by what is known as a follow-up angle. In particular, the adsorption chamber can be in a drum-like form, and the operating region and the regeneration region, as well as optionally the cooling region, can be in the form of sector-shaped regions. The rotatable adsorption chamber, which is provided according to said embodiment, makes it possible to construct the adsorption device in a simple manner and to carry out the movement of the adsorption material in a simple manner.

In the case of an adsorption device comprising a rotatable adsorption chamber, the dimensions of the operating region, the regeneration region and, if present, the cooling region, and the size of the portion which is to be moved out of the regeneration region in the follow-up operating phase, can be indicated as an angle. In the case of a drum-like, cylindrical adsorption chamber and an operating region, a regeneration region and optionally a cooling region which are in the form of sectors, the dimensions of the individual regions are then specified on the basis of the angle taken up in each case about the axis of rotation of the adsorption chamber.

In one embodiment, the portion of the adsorption material can be moved out of the regeneration region in the follow-up operating phase at the same speed that the adsorption material is moved in a load operating phase. Alternatively, the portion could be moved out at an increased speed by comparison thereto, wherein, when a cooling region is present, the question of which cooling gas mass flow should come into contact with the portion which has been moved out for sufficient cooling is preferably taken into consideration.

In the case of an adsorption device comprising a rotatable adsorption chamber, in one embodiment, the speed with which the adsorption material is moved is an angular velocity of the adsorption chamber about the axis of rotation.

It is apparent that, for example in the case of a cylindrical adsorption chamber, which is uniformly equipped with the adsorption material, a measurement for the size of the portion which is moved out of the regeneration region in the follow-up operating phase results, as a follow-up angle, from the integral of the angular velocity of the adsorption chamber in the follow-up operating phase over time, and in the case of a constant angular velocity, from the product of the duration of the follow-up operating phase and angular velocity.

In one embodiment, in the load operating phase, the adsorption chamber rotates about the axis of rotation thereof at a speed of between 2 revolutions per hour and 25 revolutions per hour.

In a preferred embodiment, the warm-up operating phase lasts between 10 seconds and 500 seconds.

In another embodiment, a silica gel or alternatively a molecular sieve is used as the adsorption material.

In one embodiment, operating data and/or parameters which are taken into consideration when determining the duration of the warm-up operating phase and/or the duration of the follow-up operating phase and/or the size of the portion which is to be moved out of the regeneration region in the follow-up operating phase, or on the basis of which the load and/or follow-up operating phase is initiated, can be provided at least in part by a control unit of the input compressor.

In all of the above-mentioned cases in which operating data are taken into consideration, the selection of the operating data which are to be taken into consideration can also be made dependent for example on which operating data are already captured and/or measured or simply can be measured and/or can be captured in or at the adsorption device and/or in the system in which the adsorption device is used, in particular in or at the input compressor, and/or are already calculated or otherwise provided for example by a control unit of the adsorption device, the input compressor or the system in each case.

Preferably, operating data and/or parameters which are already present and/or recorded in the compressor control system can be drawn on. The control unit which is used to control the adsorption device is preferably configured to evaluate at least one pressure booster input variable, in particular a speed of the input compressor and/or a pressure in the input compressor and/or a pressure in the adsorption device, and to control the speed of the pressure booster accordingly. The pressure booster input variable can alternatively or additionally be detected by means of a measuring device which is provided for this purpose.

In particular, the adsorption device which is to be operated according to the first or second method according to the invention or the embodiments thereof can be an adsorption drying device as described in EP2332631 B1.

In particular, in embodiments of the control unit, said unit can comprise a suitable data storage device on which a program which can be run by means of a computing device, in particular using a microprocessor, is stored, wherein the control means can be in the form of routines or subroutines or other suitable functional components of the program. Alternatively, the control unit could also be able to be connected to a remote data storage device on which the program is stored, in order to run said program. Additional required data, for example predetermined parameters of the system and/or the adsorption device and/or the adsorption material can be stored on the data storage device. The control unit can comprise the computing device or can be in the form of a component thereof.

In one embodiment of the invention, it is additionally proposed to equip an adsorption device or an input compressor with a control unit of this type.

The above-mentioned embodiments and developments of the invention can be combined with one another as desired where appropriate. Further possible configurations, developments and implementations of the invention also do not comprise explicitly mentioned combinations of features of the invention described previously or in the following with respect to the embodiments. In particular in this case, a person skilled in the art will also add individual aspects as improvements or supplements to the respective basic form of the invention.

BRIEF DESCRIPTION OF FIGURES

The present invention will be described in greater detail below with reference to the embodiments shown in the schematic drawings of the figures, in which

FIG. 7B are a series of eleven schematic sketches a'-g2' of an adsorption chamber of an adsorption device according to FIGS. 1 and 2 in a very simplified view from below, wherein in each case, the loading of the adsorption material is indicated in a simplified manner to illustrate a method according to a second embodiment of the invention;

FIG. 10A shows a detection device which can be used when carrying out the methods according to the first and second embodiment, schematically;

FIG. 10B shows a measuring device which can be used when carrying out the methods according to the first and second embodiment, schematically;

FIG. 10C shows a computing device which can be used when carrying out the methods according to the first and second embodiment, schematically; and FIG. 11 shows a control unit for carrying out the method according to the second embodiment, schematically.

Figure 1:
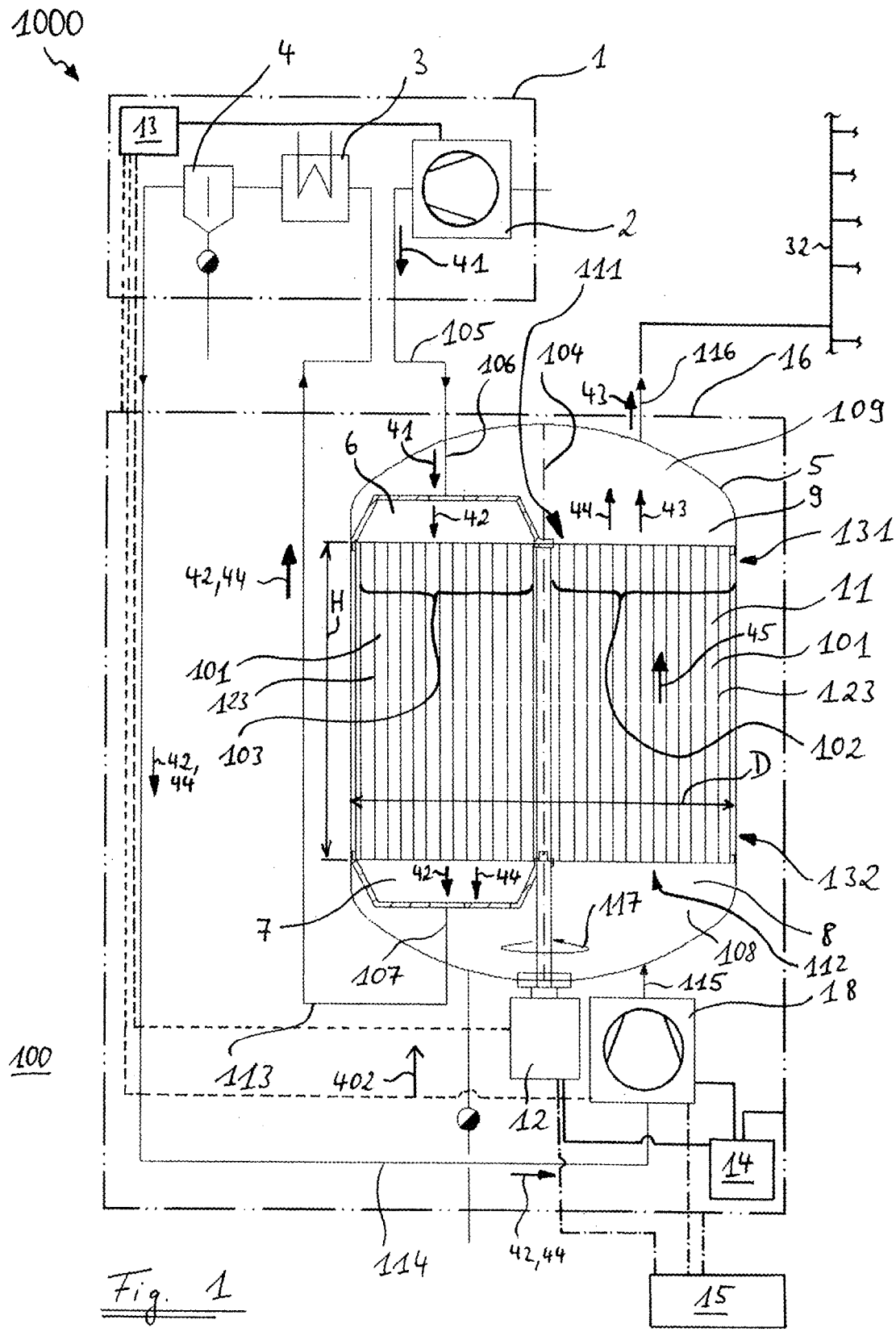
FIG. 1 is a schematic view of a system comprising an adsorption device, as is used in the method according to the embodiments of the present invention which are described below, wherein the adsorption device is sketched in part in a vertical section.

The accompanying drawings should facilitate further understanding of the embodiments of the invention. They illustrate embodiments and are used, in conjunction with the description, to explain principles and concepts of the invention. Other embodiments and many of the above-mentioned advantages emerge from the drawings. The elements of the drawings are not necessarily shown to scale with respect to one another. In the figures of the drawings, elements, features, features and components which are like, functionally like or have the same effect—unless otherwise specified—are each provided with the same reference numerals.

DESCRIPTION OF EMBODIMENTS

The embodiments described below relate by way of example to drying compressed air. An air flow thus forms an example of a gas flow from which a component, below by way of example, water, is to be extracted at least in part. However, it is understood that the proposed solution can also be applied to other adsorption processes, for example drying other gases, in particular other pressurised gases, such as nitrogen, natural gas, or gases from chemical production processes.

Before embodiments of the methods according to the invention are explained, the construction of an adsorption device of the type which is used in the embodiments described below should be presented.

In FIG. 1, a system 1000 comprising an adsorption device 16 and an input compressor 1 is shown schematically. The input compressor 1 can be a dry-running screw compressor or a turbo compressor and is used in FIG. 1 to compress air, to provide a compressed air flow, and the adsorption device 16 is used to dehumidify or dry the compressed air. In addition, a supply network 32, in this example a supply network for distributing the compressed air, is shown, wherein a container for storing the compressed air can also be connected to the supply network 32. The supply network 32 can be connected to the adsorption device 16 on the output side, if necessary whilst interposing additional components such as pipelines, valves, branches etc.

An adsorption material 123, for example a silica gel, is located in an adsorption chamber 11, which is in a drum-like form and in this example is substantially cylindrical, and is sketched in a longitudinal section in FIG. 1. The adsorption chamber 11 is mounted so as to be able to rotate about an axis of rotation 104 in an adsorption chamber 5, and a chamber drive 12 is provided, by means of which the rotation of the adsorption chamber 11 around the axis of rotation 104 can be brought about.

The adsorption chamber 11 can be formed with a plurality of adsorption channels 101 which contain or comprise the adsorption material 123, and through which a gas flow can flow in such a way that the gas flow comes into contact with the adsorption material 123 in an effective manner.

In stationary operation, e.g. a prolonged load operating phase, the input compressor 1 transports compressed air, and the adsorption chamber 11 rotates about the axis of rotation 104 thereof in the direction of the arrow 117, as a result of which consecutive portions of the adsorption chamber 11 and thus also of the adsorption material 123 are moved continuously and in a recurring manner through a sector-shaped operating region 102 which is shown in FIG. 1 in a sectional view, and can also be referred to as a drying sector, and through a regeneration region 103 which is likewise shown in a sectional view, and can be referred to as a regeneration sector.

The air to be dried, which is compressed in a compressor block 2 of the input compressor 1, is supplied as an input gas flow 41 via a pipeline 105 to a regeneration inlet chamber 6 which is arranged at a first end 111 of the adsorption chamber 11. As shown in FIG. 1, the entire warmed input gas flow 41, which leaves the compressor block 2, is supplied to the regeneration inlet chamber 6 as a full flow and flows through the adsorption chamber 11 with the adsorption material 123 as a regeneration gas flow 42.

Figure 2:
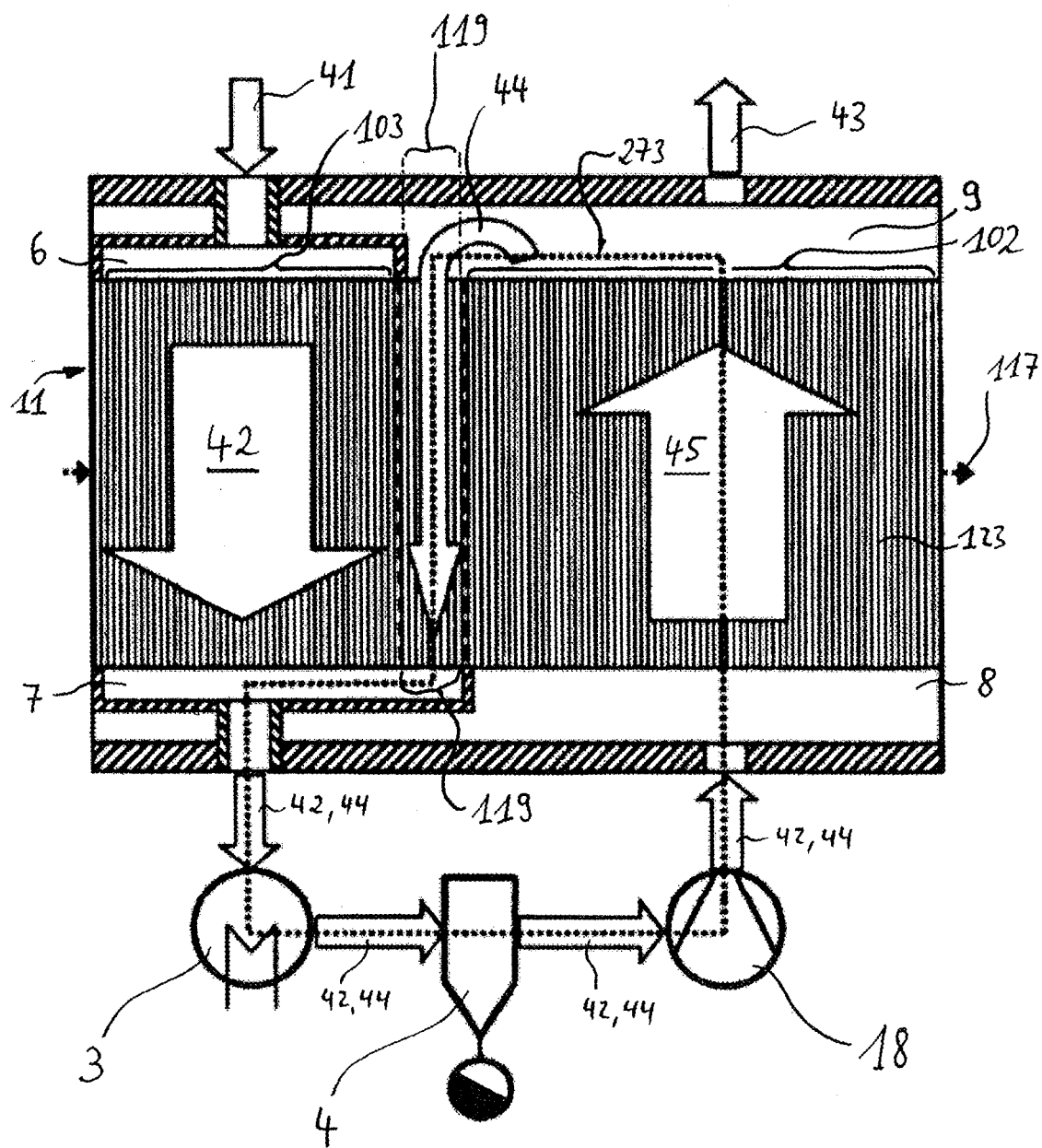
FIG. 2 is a further schematic view of the adsorption device from FIG. 1, wherein an adsorption chamber comprising an adsorption material and adjacent portions of the adsorption device is shown in a developed view, and the gas flows flowing through the adsorption chamber are indicated.

In the regeneration region 103, the gas flow thus flows as a regeneration gas flow 42 through the adsorption channels 101 and comes into contact with the adsorption material 123, as a result of which the regeneration gas flow 42 picks up moisture from the adsorption material 123 by means of desorption. In this way, the adsorption material 123 is regenerated in the regeneration region 103. By means of a regeneration outlet chamber 7 at a second end 112 of the adsorption chamber 11, the regeneration gas flow 42 is discharged from the regeneration region 103, wherein the regeneration gas flow 42 is combined in the regeneration outlet chamber 7 with another gas flow, specifically a cooling gas flow 44 which is shown in FIG. 2, and supplied together with said gas flow to a cooler 3 and subsequently to a condensate separator 4 via a pipeline 113. The cooler 3 and the condensate separator 4 can form parts of a compressor/condenser unit. In the condensate separator 4, condensed water is separated from the gas flow which is formed of the two combined gas flows 42 and 44.

Via a pipeline 114, the gas flow, which additionally corresponds to the gas flow formed by combining the regeneration gas flow 42 and the cooling gas flow 44, is supplied to a pressure booster 18, which can be in the form of a fan. In the pressure booster 18, the pressure of the gas flow is increased. The gas flow is then supplied via a pipeline 115 to a drying inlet chamber 8 at the second end 112 of the adsorption chamber 11. The combined gas flows 42, 44 coming from the pressure booster 18 flow as a gas flow 45 through a portion of the adsorption chamber 11—and thus also through a portion of the adsorption material 123—which is located in the operating region 102 at that time. At the first end 111 of the adsorption chamber 11, the gas flow 45 is received by a drying outlet chamber 9. The operating region 102 thus extends between the drying inlet chamber 8 and the drying outlet chamber 9, in the form of a drying sector in which the gas flow 45 comes into contact with the adsorption material 123. The gas temperature of the gas flow 45 is lower than the temperature of the regeneration flow 42. For example, the temperature of the gas flow 45 when it flows through the adsorption chamber 11 in the operating region 102 can be between 10 degrees Celsius and 60 degrees Celsius. In the operating region 102, water is extracted from the gas flow 45 by means of adsorption, and the gas flow 45 is thus dried. In order to achieve the best possible pressure dew points in this case, i.e. the lowest possible water content of the gas flow 45 after the drying in the operating region 102, in particular the moisture content of the adsorption material 123 in the upper region 131 of the adsorption chamber 11 near the first end 111 is also important.

In the adsorption device 16 shown in FIGS. 1 and 2, part of the gas flow 45 forms a dried output gas flow 43 which can be supplied to the destination thereof by means of an output pipeline 116.

The adsorption chamber 11 together with the cooler 3, the condensate separator 4 and the pressure booster 18 is sketched in FIG. 2 in a developed view in the peripheral direction. The gas flows are indicated by means of arrows, wherein a sector-shaped cooling region 119 and the cooling gas flow 44 are also indicated in FIG. 2. The rotational movement 117 of the adsorption chamber 11 takes place in such a way that the adsorption material 123 moves continuously through the regeneration region 103, the cooling region 119, the operating region 102 and subsequently through the regeneration region 103 again in a recurring manner.

The cooling gas flow 44 is formed of part of the gas flow 45 which leaves the adsorption chamber 11 after the drying in the operating region 102, and is fed out of the drying outlet chamber 9. Part of the gas flow 45 dried in the operating region 102, the temperature of which is lower than the temperature of the regeneration gas flow 42, thus flows as a cooling gas flow 44 in the cooling region 119 through the channels 101 of the adsorption chamber 11 which are located there at that time, and comes into contact there with the adsorption material 123 and thus cools down the portion of the adsorption chamber 11 and adsorption material 123 which is located in the cooling region 119, before said portion is moved into the operating region 102.

The pressure booster 18 can be formed for example with a side-channel compressor which is arranged inside the drying inlet chamber 8 or in the adsorption container 5. In one variant, the pressure booster 18 can be formed with a radial compressor which can comprise for example a diffuser nozzle.

By way of example, the adsorption chamber can have a height H of approximately 400 mm and a diameter D of approximately 600 mm, and the adsorption device 16 comprising the chamber drive 12 can be configured in such a way that, in stationary operation, it can rotate about the axis of rotation 104 thereof at a speed of between 2 revolutions per hour and 25 revolutions per hour.

In order to control the adsorption device 16, the adsorption device 16 can comprise a control unit 14 which is used in particular to control the chamber drive 12 and the pressure booster 18. However, the functionality of the control of the adsorption device 16 could instead be implemented in a control unit 13 of the input compressor 1 or in an external control unit 15. Corresponding variants are likewise shown schematically in FIG. 1. The sketched control units 13, 14, 15 are to be understood only by way of example, and it is understood that in different embodiments, one or all of the control units 13, 14, 15 or a suitable combination of two of said control units 13, 14, 15 can be present and connected to the components to be controlled and the optionally present measuring and detection devices MD, DD (cf. FIG. 10B, 10A). Each of the control units 13, 14, 15 can comprise a computing device CD (FIG. 10C), can be configured as a component of a computing device of this type, or can be connected to a computing device of this type for the purpose of a signal/data exchange.

In order to regenerate the adsorption material 123 in the regeneration region 103, sufficient heat should be available to desorb the water picked up in the operating region 102 during the drying of the compressed air. In order to achieve the best possible pressure dew point, i.e. the best possible water concentration in the gas phase, after drying—in other words, the lowest possible water concentration in the flowing-off dried compressed air—when the adsorption material 123 in the sector-shaped operating region 102 is flowed through vertically from bottom to top—the loading of the adsorption material 123 which is achieved in the upper region 131 of the rotating adsorption chamber in particular is decisive, since the equilibrium concentration of the water in the gas phase is determined by said loading, it being possible to reduce the water content of the gas phase until said concentration is reached. Said loading is substantially determined by the moisture and temperature of the regeneration air which flows through the adsorption material immediately before being taken out of the regeneration region 103. Said loading can be reduced by the regeneration at most to the equilibrium loading corresponding to the moisture and temperature of the regeneration air.

When the transportation of compressed air is stationary, for example as a result of a temporary interruption during intermittent operation, the components of the adsorption device 16 and of a system 1000 in which the adsorption device 16 is used, such as pipelines or pulsation dampers, can cool down. The adsorption material 123 itself also cools down when the transportation of compressed air is stationary. In particular, the adsorption material 123 can cool down in a relatively short time span, especially when only a relatively small mass of adsorption material 123 is present. Immediately after the start of the input compressor 1—when the transportation of compressed air is started or resumed—the adsorption equilibrium which can be achieved in the sector-shaped regeneration region 103 is considerably less favourable than in stationary operation. As a result, the minimum achievable water content of the adsorption material 123 is initially considerably higher than in later stationary operation. Thus, in a portion which is located in the regeneration region 103 in this timespan, the adsorption material 123 is not regenerated to as great an extent as is possible in stationary operation, and an adsorption material 123 in this portion which is already sufficiently regenerated before the last stop of the input compressor 1 can pick up moisture from the regeneration air again. If this portion of the adsorption material 123 reaches the operating region 102 when the adsorption chamber 11 is immediately rotated further, the compressed air is dried to a lesser extent, i.e. the pressure dew points are higher, which can be undesirable in certain circumstances.

A method according to the first embodiment of the present invention avoids this problem. According to the first embodiment, as shown in the schematic flow chart in FIG. 6, the steps described below are therefore carried out:

When the transportation of compressed air is started or resumed proceeding from a "stop" mode which corresponds to an operation intermission 204, then a control unit firstly brings the adsorption device into a warm-up operating phase 201 ("warm-up" mode), as shown by the arrow 241. During the warm-up operating phase 201, the pressure booster 18 is already running, which is configured for example as a fan, whereas the adsorption chamber 11 is stationary relative to the operating region 102 and the regeneration region 103 during the warm-up operating phase 201, and therefore does not rotate about the axis of rotation 104. The chamber drive 12 is thus deactivated during the warm-up operating phase 201.

As soon as sufficient regeneration conditions have been established during the current warm-up operating phase 201, the control unit switches to a load operating phase 202 ("load" mode) and starts the rotation of the adsorption chamber 11 about the axis of rotation 104. For this purpose, the chamber drive 12 is activated by means of the control unit. This is indicated by the arrow 212. In the load operating phase 202, the input compressor 1 and the pressure booster 18 are also in operation.

Figure 6:
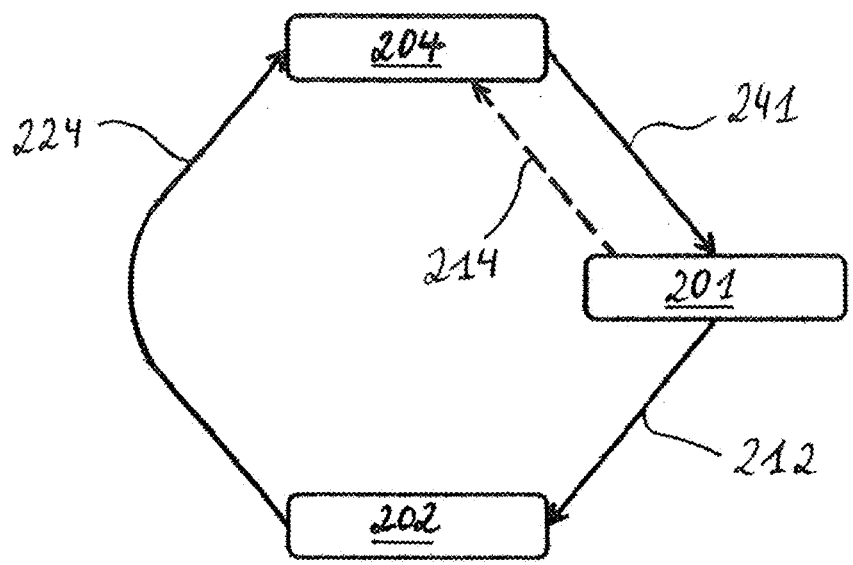
FIG. 6 is a flow chart for illustrating the method according to the first embodiment of the invention.

As shown by the arrow 224 in FIG. 6, when the transportation of compressed air is discontinued or interrupted, the load operating phase 202 transitions into the "stop" mode, which corresponds to an operating intermission 204. In the operating intermission 204, the adsorption chamber 11 is stationary, and the compressed air is not transported.

Whether sufficient regeneration conditions are present, in other words, whether operating conditions which allow sufficient regeneration of the adsorption material 123 in the regeneration region 103 are present, is preferably checked continuously or periodically during the current warm-up operating phase 201 and can be established in various ways.

In a first variant, the presence of sufficient regeneration conditions can be established on the basis of a predetermined threshold value for the regeneration inlet temperature being exceeded, i.e. the temperature in the regeneration gas flow 42 when it enters the regeneration region 103, for example when it flows into the regeneration inlet chamber 6.

In order to prevent a high temperature threshold value from being reached too late or not being reached at all in certain operating conditions, or to prevent a lower threshold value from causing the adsorption chamber 11 to already start when the regeneration conditions are still considerably lower than what is achievable, which in turn would impair the drying of the gas, the temperature threshold value can advantageously be manually or automatically adapted to the operating conditions.

In a second variant, the presence of sufficient regeneration conditions can be established by determining when the rate of increase, i.e. the rate of change over time, of the regeneration inlet temperature falls below a specified threshold or limit value. In this variant, the rotation 117 of the adsorption chamber 11 thus starts depending on whether the regeneration conditions continue to improve or stop becoming substantially more favourable.

In a third variant, in addition to or instead of the regeneration inlet temperature and the rate of increase thereof or the rate of change thereof over time, it could be ensured that the warm-up does not last too long. A delay time, for example, is conceivable, at the end of which the control unit starts the rotation of the adsorption chamber 11 regardless of criteria for the regeneration conditions. This delay time could be fixed or could also be determined on the basis of the required amount of gas or the required gas mass flow and/or the time after the end of the last load operating phase, or also the end of the last warm-up or follow-up operating phase.

In another variant, it can be provided that a measurement, for example an angle, for the movement that the adsorption material 123 would have carried out relative to the operating region 102 and the regeneration region 103 during the duration of the warm-up operating phase 201 if the adsorption device 16 had been operated in a load operating phase 202 instead of in the warm-up operating phase 201, is determined, and that the rotation of the adsorption chamber 11 is started when said measurement exceeds a specified value.

In other variants, in order to establish the presence of sufficient regeneration conditions, current operating data such as values and rates of change for
- a regeneration inlet temperature, as just described,
- a regeneration outlet temperature, i.e. the temperature of the regeneration gas flow 42 when it leaves into the regeneration outlet chamber 7,
- a compression pressure provided by the input compressor 1, for example in the input gas flow 41,
- additional temperatures of the overall system of the input compressor 1 and the adsorption device 16, e.g. an intake air temperature of the last compression stage of the input compressor 1 or cooling water temperatures which thus represent operating data of the system 1000,
- a compressed air mass flow are taken into consideration. Said operating data can be taken into consideration separately or in a suitable combination with one another, and additionally or alternatively also for one or more previous operating phases/operating intermissions 201, 202, 203, 204. In addition, the already accumulated duration of the current warm-up operating phase 201, and/or the duration of one or more previous operating phases, namely warm-up operating phases 201, load operating phases 202 and/or follow-up operating phases 203, and/or the duration of operating intermissions 204 in which no compressed air is transported, can be taken into consideration.

However, if sufficient regeneration conditions are already established when the transportation of the gas flow is resumed—for example when the transportation is interrupted for only a very short time—in some cases, the duration of the warm-up operating phase 201 can reduce to zero, so that in these cases, the warm-up operating phase 201 is omitted, and a load operating phase 202 is initiated immediately. Alternatively, it is also possible, when the transportation only lasts for a short time, for the warm-up operating phase 201 to not yet be complete when the transportation is interrupted. In this case, the warm-up operating phase 201 is terminated and immediately transitions into the operating intermission 204 (see arrow 214 in FIG. 6).

A measuring device MD, which can be present in the system 1000 from FIG. 1, or also in a system 2000 from FIG. 9, which is still to be described later, and is configured to measure required operating data of the adsorption device and/or operating data of the system and/or durations, is sketched schematically in FIG. 10B. If operating data or durations are to be calculated or estimated, a computing device CD from FIG. 10C is provided for this purpose. In FIG. 10A, a detection device DD is also shown schematically, which can be used in the system 1000 or 2000 to detect when the transportation of compressed air is discontinued or interrupted, and to detect when the transportation of compressed air is started or resumed. It is understood that the measuring device MD and the detection device DD can also be formed together in a component and that, instead, each of the devices MD, DD can also be in the form of a plurality of separate components, for example in order to measure a plurality of different operating data or durations or to detect a plurality of different events. Measuring and detection devices MD, DD can be connected to the computing device CD in a suitable manner if necessary. If necessary, the devices MD, DD, CD or the components thereof can be used at any desired suitable position in the systems 1000, 2000 in order to determine data required for the operation described here of the adsorption device, according to the selected variant. For example, the measuring device MD can be configured to measure durations, temperatures, pressures, amounts of gas, gas mass flows or speeds etc. Any rates of change which may be required can be determined for example by means of the computing device CD.

The advantages of the warm-up operating mode 201, as provided in the method according to the first embodiment, will now be explained in greater detail with reference to FIGS. 3 and 4.

Figure 3:
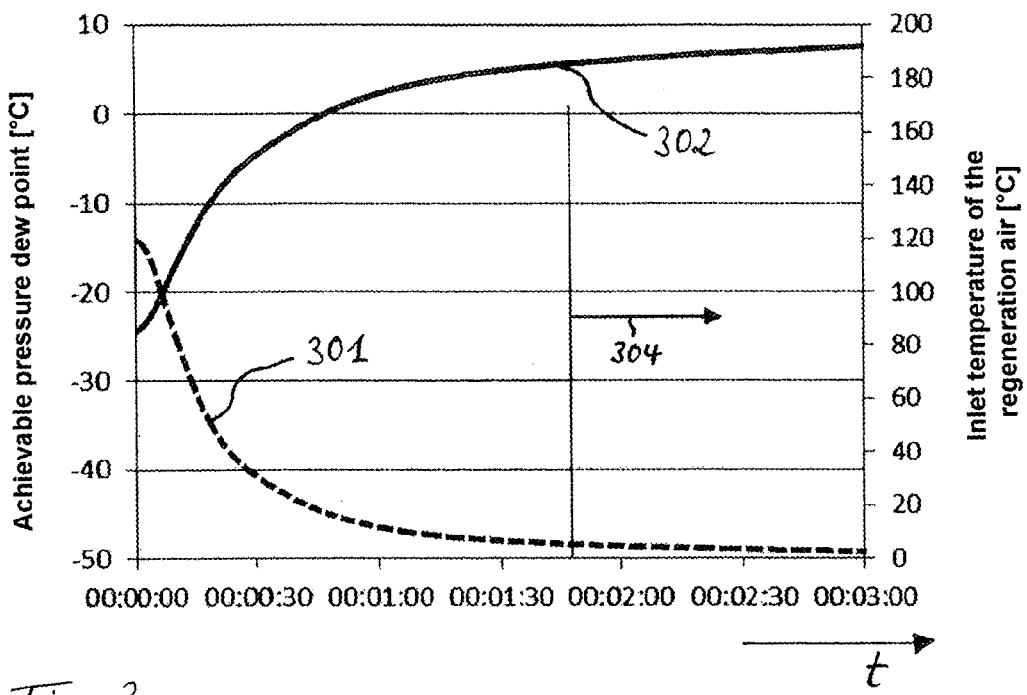
FIG. 3 is a first schematic diagram for illustrating a warm-up operating phase.

In FIG. 3, a progression of the inlet temperature of the regeneration air 302—i.e. the temperature at which the regeneration gas flow 42 enters the regeneration region 103—is shown schematically by way of example in the case of the transportation of compressed air being resumed, as could occur in the case of the adsorption device 16 from FIGS. 1 and 2. The transportation is resumed at the time 00:00:00.

The curve 301 indicates the pressure dew point which could be achieved in the operating region 102 (corresponding to a drying sector) at any time if the adsorption material 123 had the load which would ensue if the adsorption equilibrium were reached at the current inlet temperature of the regeneration air. It can be seen that at the outset, these pressure dew points 301 are considerably higher than the values that result after slightly longer operation. Adsorption material which has already been regenerated in the upper region 131 of the adsorption chamber 11 therefore picks up some moisture again in the regeneration region 103. If the adsorption chamber 11 were rotated further in this situation, said moisture would lead to less drying in the operating region 102. When starting the adsorption chamber is delayed by the warm-up operating phase 201, as can be seen in FIG. 3, the inlet temperature of the regeneration air is already so high that low pressure dew points can be achieved. The time at which the adsorption chamber 11 starts to rotate in the example in FIG. 3 is indicated by means of the arrow 304 and a vertical line.

Figure 4:
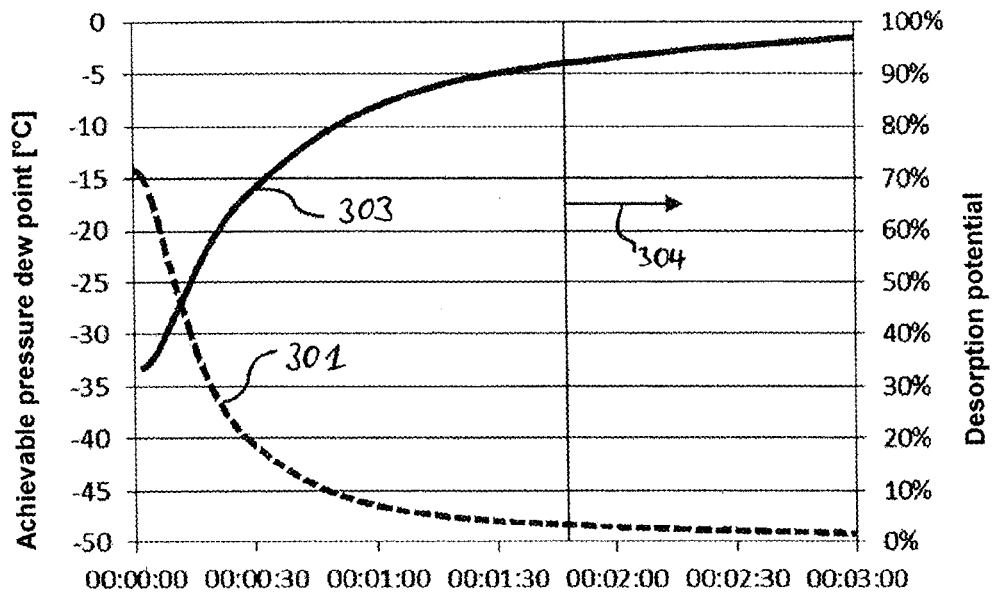
FIG. 4 is a second schematic diagram for illustrating a warm-up operating phase.

In FIG. 4, in addition to the achievable pressure dew point 301, the desorption potential is also indicated as a curve 303. In this case, the desorption potential 303 indicates how much regeneration heat is available for the regeneration, by comparison with stationary operation. It can be seen that a large amount of regeneration heat is already available to the adsorption chamber 11 before the start. Despite the particularity in the upper region 131 of the adsorption chamber, which particularity is described further above, the adsorption material 123 can thus still be substantially regenerated in the regeneration region 103.

The method according to the first embodiment can be used particularly advantageously in conjunction with a rotary dryer with full flow regeneration, as shown by way of example in FIGS. 1 and 2. In such a case, a large amount of regeneration heat is available, which is generally much greater than requirements.

The course of the method according to the first embodiment of the invention will now be explained on the basis of the operating modes a to g of the adsorption device 16 which are shown in the partial pictures a to g2 from FIG. 5.

Figure 5:
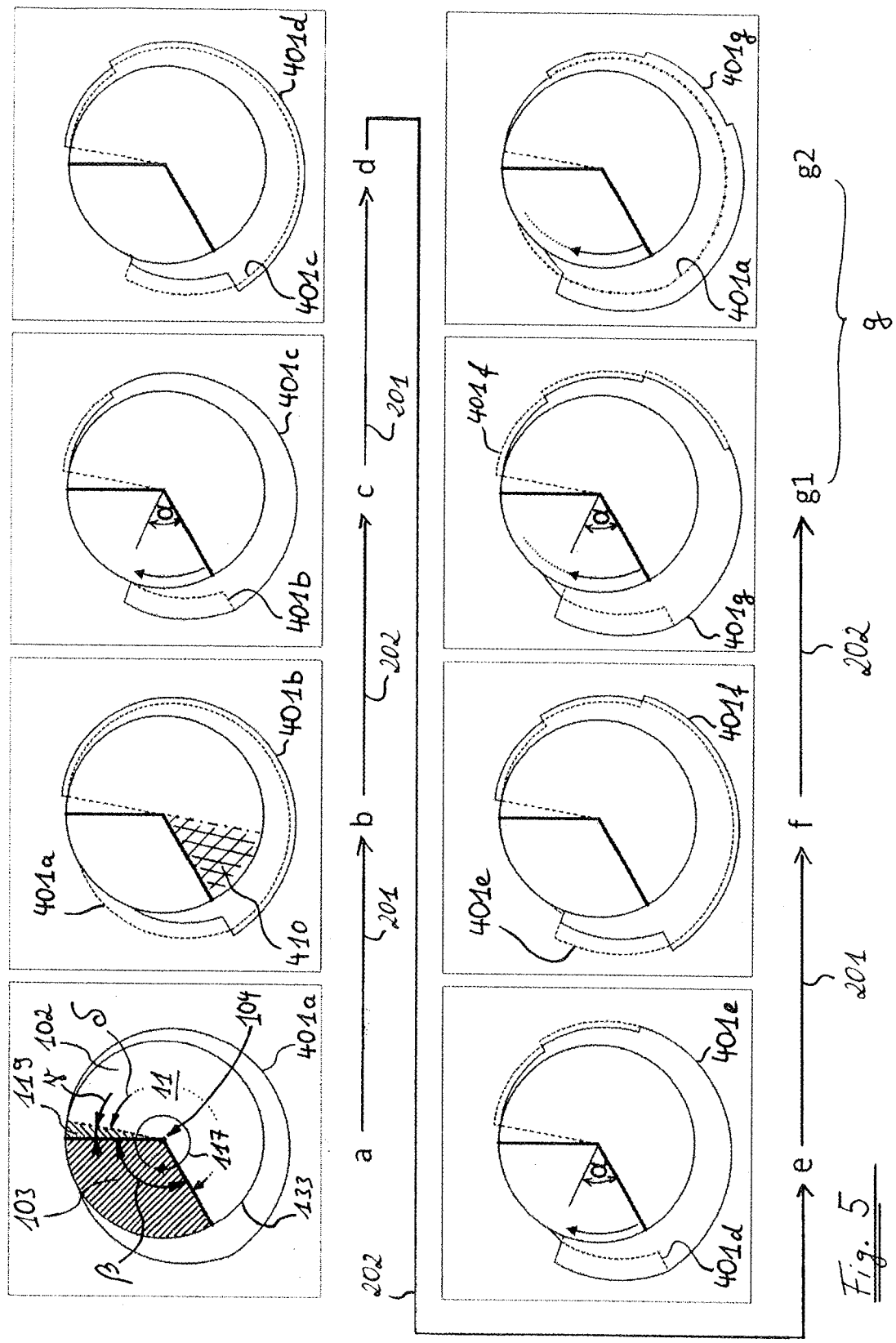
FIG. 5 is a series of eight schematic sketches a—g2 of an adsorption chamber of an adsorption device according to FIGS. 1 and 2 in a very simplified view from below, wherein in each case, the loading of the adsorption material is indicated in a simplified manner to illustrate a method according to a first embodiment of the invention.

FIG. 5 shows the loading in various consecutive operating modes a to g of the adsorption device 16. For the operating modes sketched in FIG. 5, it is simply assumed by way of example that 75 percent of the available regeneration heat is sufficient to desorb the moisture picked up during a passage through the operating region 102 from the adsorption material 123 again. This numerical value is used here merely by way of illustration, and could differ in other, equally advantageous and useful examples.

In the individual sketches in FIG. 5, the moisture content of the adsorption material is shown as a solid line around the adsorption chamber 11, wherein the radial distance from the perimeter 133 of the adsorption chamber 11 represents a measurement of the loading. The loading is shown for each individual mode by reference numerals 401a to 401g. In the partial pictures a to g1, the dashed line extending around the adsorption chamber 11 shows the progress of the loading from the previous partial picture in each case.

For the purposes of explanation, it is additionally simply assumed by way of example that the loading increases linearly during the time that the adsorption material 123 dwells in the operating region 102 (drying sector) and decreases linearly during the time that the adsorption material 123 dwells in the regeneration region 103 (regeneration sector). In continuous operation, the lowest possible loading value under the given regeneration conditions, i.e. the maximum possible regeneration, is achieved after three quarters of the regeneration sector. This is shown in the drawings in that the curve for the loading then meets the perimeter 133 of the adsorption chamber. In practice, it is not possible to achieve loading of exactly zero; in the drawings in FIG. 5 and in the following explanations, zero loading should stand for the lowest possible loading by the regeneration conditions in each case.

However, the actual progression is usually substantially more complex. By way of example, it should be noted that the loading of the adsorption material 123 in the flow direction (not shown here) (substantially perpendicularly to the plane of the drawing in FIG. 5, i.e. in parallel with the axis of rotation 104) will not be constant. The loading curves 401a to 401g can therefore be understood in FIG. 5 to be loading averaged over the height H of the adsorption chamber 11. In this way, the progression of the method according to the first embodiment of the invention can be illustrated in a simple manner.

Partial picture a shows the schematically simplified construction of the adsorption device 16 from below; the viewing direction is indicated by the arrow 402 in FIG. 1. In the left upper part of the partial picture, the sector-shaped regeneration region 103 is arranged between the two thick radial lines and extends over an angle β about the axis of rotation 104, which in this example is approximately 120°. By contrast, the sector-shaped cooling region 119 is smaller than the regeneration region 103 and, in the upper part of partial picture a, extends to the right from the centre of the adsorption chamber 11 as far as a dashed radial line. In FIG. 5, the cooling region 119 occupies an angle γ, which is for example approximately 10°. For the purposes of clarification, in partial picture a, the regeneration region 103 and the cooling region 119 are provided with various diagonal cross-hatchings. The remaining part of the full circle represents a sector-shaped operating region 102 which acts as a drying sector. In the example shown, the operating region 102 thus extends over an angle δ of approximately 230°. In this case, however, it is understood that the angles β, γ and δ can also be selected to be different in other advantageous and useful embodiments. The adsorption chamber rotates in a clockwise direction, as indicated by the arrow 117, i.e. the sectors are passed through in the order drying—regeneration—cooling. The layout of the other partial pictures, b to g2, corresponds to that of partial picture a.

Operating Mode in Partial Picture a:

The illustrated progression of the loading 401a over the peripheral direction of the adsorption chamber 11 corresponds to a progression of the type which can ensue in stationary operation, i.e. in the case of continuous transportation of the compressed air flow and continuous rotation 117 of the adsorption chamber 11. If the transportation is interrupted in this state, an operating intermission 204 occurs, in which the loading progression 401a prevails. Partial picture a thus shows the situation when the transportation of compressed air is stopped and at the time when the transportation of compressed air is later resumed.

Transition from Partial Picture a to Partial Picture b:

The transportation of compressed air with the loading 401a comes to a standstill, and the system is cooled down, i.e. in particular the adsorption material 123, supply and discharge lines (not shown), and the input compressor 1 and the air masses located therein cool down. Compressed air is then required again, and the transportation of compressed air is resumed. A warm-up operating phase 201 is triggered, during which compressed air is transported through the adsorption device 16, but the adsorption chamber 11 is stationary. In this case, air flows through the operating region 102, the regeneration region 103 and the cooling region 119. The loading state 401b at the end of the warm-up operating phase 201 is shown in partial picture b, in which the regeneration which has taken place in the regeneration region 103 in the meantime can be seen.

Transition from Partial Picture b to Partial Picture c:

At the end of the warm-up operating phase 201, a load operating phase 202 is initiated, during which compressed air is additionally transported through the adsorption device 16, and the adsorption chamber 11 rotates by the angle of rotation a. In this case, a portion of the adsorption chamber 11 and thus also a portion 410—indicated in FIG. 5 by cross-hatching—of the adsorption material 123, which portion is located in the adsorption chamber 11, moves out of the operating region 102 into the regeneration region 103. In the meantime, air flows continuously through the operating region 102, the regeneration region 103 and the cooling region 119.

Transition from Partial Picture c to Partial Picture d:

After the adsorption chamber 11 has rotated by the angle α, the transportation of compressed air is interrupted and the adsorption chamber 11 is stationary once again. The system cools down again. The transportation of compressed air is then resumed, and a warm-up operating phase 201 is initiated in turn, during which the adsorption chamber 11 is stationary. At the end of said warm-up operating phase 201, the load distribution 401d prevails.

Transition from Partial Picture d to Partial Picture e:

In another load operating phase 202, the adsorption chamber 11 rotates by the angle α in a clockwise direction once again, whilst compressed air is transported. Another portion of the adsorption material 123 is thus moved into the regeneration region 103.

Transition from Partial Picture e to Partial Picture f:

In the mode in partial picture e, the transportation of compressed air is interrupted again, the adsorption chamber 11 is stationary again, and the system in turn cools down. When the transportation of compressed air is resumed again, another warm-up operating phase 201 is initiated, during which the adsorption chamber 11 is stationary.

Transition from Partial Picture f to Partial Picture g1:

At the end of the warm-up operating phase 201, another load operating phase 202 is triggered. The adsorption chamber 11 rotates once again by the angle α, whilst compressed air is additionally transported.

In the mode shown in partial picture a, as ensues in stationary operation, the loading 401a in the direction of rotation 117 of the adsorption chamber 11 increases from zero at the output of the cooling region 119 up to a maximum value at the end of the operating region 102, i.e. of the drying sector. In the progression of the regeneration region 103, the loading value 401a decreases again, until the value zero is reached after three quarters of the regeneration region 103.

It is assumed that in the loading state shown in partial picture a from FIG. 5, the transportation of compressed air is stopped, the rotation of the adsorption chamber stops at the same time, and the system then cools down. As described above, said stopping of the transportation of compressed air is repeated with subsequent cooling in partial picture c and partial picture e.

As explained above with reference to FIGS. 3 and 4, as a result of the cooling, the regeneration temperature when the transportation of compressed air is resumed in each case is still too low to achieve a desired low equilibrium loading of the adsorption material 123, and therefore the rotation of the adsorption chamber 11 is initially not started. However, when the adsorption chamber is stationary, the regeneration heat is still sufficient to remove a majority of the water from the adsorption material 123. The water content in the portion of the adsorption material 123 which is located in the regeneration region 103 reduces accordingly until the rotation of the adsorption chamber starts. By contrast, the water content in the operating region 102 (drying sector) increases whilst the adsorption chamber is stationary. This is shown in partial pictures b, d and f from FIG. 5.

As described, in partial pictures c, e and g1, the adsorption chamber is rotated further by an angle α. In this case, the loading changes over the course of said rotation to the same extent as in partial picture a. Partial picture g2 shows the same state as partial picture g1, but in partial picture g2, the load line 401a of the state from partial picture a is shown for reference. It can be seen that the loading 401g in the operating region 102 is considerably increased with respect to the loading 401a of the stationary state.

It can thus be seen that the method according to the first embodiment of the invention can then be implemented particularly advantageously when the transportation of compressed air is occasionally interrupted. In the case of sufficiently long load operating phases 202, the increasing moisture content of the adsorption material 123 in the operating region 102 can be reduced again to the loading achieved in the stationary state, corresponding to the loading 401a, by passing the adsorption material 123 through the regeneration region 103.

Figure 8:
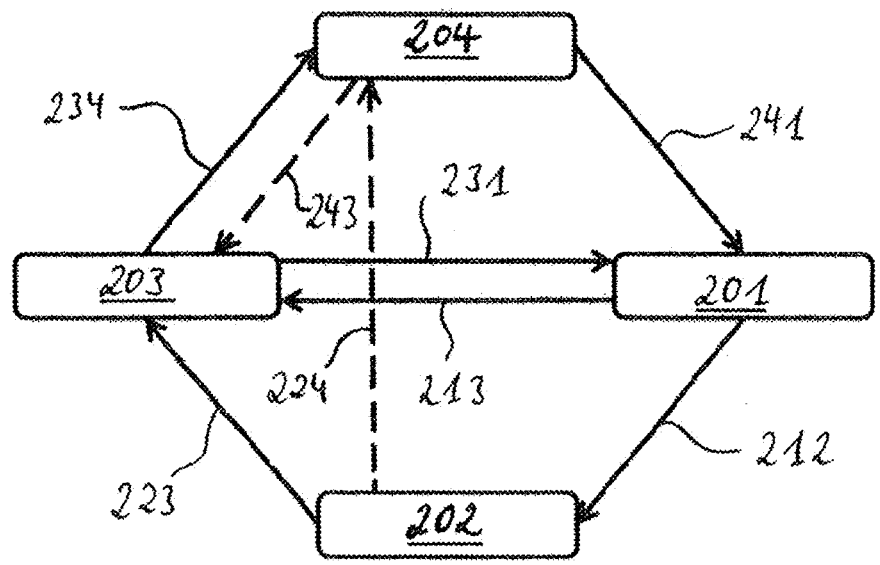
FIG. 8 is a flow chart for illustrating the method according to the second embodiment of the invention.

In FIG. 8, a schematic flow chart is shown which is intended to illustrate the principle of a method according to a second embodiment of the invention. The method according to the second embodiment is also preferably carried out by an adsorption device, as sketched in FIGS. 1 and 2 and described above.

FIG. 4 shows four operating modes of the adsorption device, namely an operating intermission 204 ("stop" operating mode), a warm-up operating phase 201 ("warm-up" operating mode), a load operating phase 202 ("load" operating mode), and a follow-up operating phase 203 ("follow-up" operating mode).

When, proceeding from the operating intermission 204, in which no compressed air is transported, the transportation of compressed air is started in order to provide dried compressed air, then the control unit firstly switches to a warm-up operating phase 201, as indicated by arrow 241. What has been said further above for the first embodiment applies to the warm-up operating phase 201 and to the determination of the duration of the warm-up operating phase 201. In the warm-up operating phase 201, the pressure booster 18 is already running, whereas the adsorption chamber 11 is stationary in relation to the operating region 102 and the regeneration region 103. In the method according to the second embodiment, in the warm-up operating phase 201, compressed air is also already being transported, i.e. the input compressor 1 is in operation.

As soon as sufficient regeneration conditions have been established during the warm-up operating phase 201, a load operating phase 202 is triggered by the control unit; see arrow 212. In this case, the rotation of the adsorption chamber 11 is started. The pressure booster 18 is additionally in operation, the input compressor 1 is additionally running, and compressed air is transported.

When the transportation of compressed air stops in the "warm-up" mode, corresponding to the warm-up operating phase 201, or in the "load" mode, corresponding to the load operating phase 202, a follow-up operating phase 203 is initiated by the control unit ("follow-up" mode); see arrows 213 and 223 in FIG. 8. If the transportation of compressed air is still interrupted during the warm-up operating phase 201, then the load operating phase 202 is not initiated, but rather the control immediately initiates the follow-up operating phase 203, as illustrated by arrow 213. If compressed air is required again in the follow-up operating phase 203, and the transportation of compressed air is resumed, then a warm-up operating phase 201 is triggered once again; see arrow 231. The follow-up operating phase 203 is preferably started immediately after the transportation of compressed air is stopped. This can be favourable in the case of intermittent operation with short intermissions in the transportation, because in this way, the probability that compressed air is required again before the follow-up operating phase 203 is complete can be reduced. However, between the time at which the transportation of compressed air is interrupted and the start of the follow-up operating phase 203, a delay can also be inserted in the form of an operating intermission 204; see the arrows 224, 243 in FIG. 8, wherein the delay preferably lasts no more than ten minutes, more preferably no more than five minutes.

FIG. 11 shows in a schematically simplified manner, by way of example, a control unit C2 for carrying out the method according to the second embodiment with some of the components thereof, wherein it is understood that the control unit C2 can also comprise other components. The control unit C2 comprises control means C13, C23, C41, C12, C34 and C31, which are used to control the adsorption device in such a way that said device carries out the transitions, indicated in FIG. 8 by the arrows 213, 223, 241, 212, 234, 231, between the operating modes 201, 202, 203 and operating intermissions 204. The control means C23, C13 are used to initiate a follow-up operating phase 203 and to control the adsorption device in such a way that, during the follow-up operating phase 203, the adsorption material moves as described in greater detail for the method according to the second embodiment, when transportation of the gas flow through the adsorption device for providing the output gas flow is at least temporarily interrupted or discontinued, which can occur for example in the load operating phase 202, but can also occur even in the warm-up operating phase 201. The control unit C2 additionally comprises evaluation means E for evaluating operating data from the adsorption device, operating data from the system in which the adsorption device is used and/or durations of operating phases and/or operating intermissions. The evaluation means can be integrated in the computing device CD, which can be configured as a component of the control unit C2, or can make use of said device.

Furthermore, the evaluation means E, in addition to the data provided by the measuring and/or detection device(s) MD, DD, can evaluate predetermined parameters of the adsorption device and/or of the adsorption material which are stored for example in the control unit C2. For this purpose, the control unit C2 can be coupled to the detection device DD and the measuring device MD in order to obtain data and/or signals therefrom and, for example using the evaluation means E, to process said data and/or signals. The predetermined parameters, and optionally intermediate results to be stored for a certain period, can be stored by means of the data storage device DSD of the control unit C2.

Whilst the transportation of compressed air is interrupted, and thus also during the follow-up operating phase 203, no additional regeneration of the adsorption material 123 located in the regeneration region 103 takes place therein. In the case of the at least temporary interruption of the transportation of compressed air, however, part of the adsorption material 123 is generally already sufficiently regenerated in the regeneration region 103. When the transportation of compressed air is started again—due to the cooling which has taken place in the meantime, and due to the thus less favourable regeneration conditions—said part would pick up some moisture again. In the method according to the second embodiment, this can be avoided by rotating the adsorption chamber slightly further after the transportation of compressed air has stopped in the follow-up operating phase 203 and, by means of this rotation by a follow-up angle, a portion of the adsorption material 123 is moved out of the regeneration region 103. This is advantageous in particular when the time intervals in which compressed air is transported are relatively short, and the adsorption chamber 11 moves only a little or not at all due to being stationary in the "warm-up" mode during the transportation of compressed air. By means of this further rotation, in such cases, the adsorption material 123 is prevented from dwelling in the operating region 102 for too long, and the adsorption material 123 is prevented from being overloaded as a result. The determination of the duration of the follow-up operating phase 203 or the size of the portion 550 or 551 which is moved out of the regeneration region 103 in the follow-up operating phase 203 will be explained in greater detail further below. In particular when the transportation of compressed air is interrupted after a sufficiently long load operating phase 202, which was preceded by a warm-up operating phase 201, then the follow-up operating phase 203 can be omitted without any problems. After the follow-up operating phase 203 is discontinued, as indicated by arrow 234, an operating intermission 204 ("stop" operating mode") is reached in turn.

Whilst the adsorption chamber 11 is rotated further in the follow-up operating phase 203, a heated region of the adsorption chamber 11 comprising hot adsorption material 123 is moved out of the regeneration region 103 through the cooling region 119. If hot adsorption material 123 arrived in the operating region 102, said material might hardly be able to cool down there—for example if there is only a short operating intermission 204—before another warm-up operating phase 201 is triggered. In order to prevent hot adsorption material 123 from arriving in the operating region 102 and impairing the drying result there, the cooling gas flow 44 is maintained during the further rotation.

This will be described in greater detail with reference to FIG. 2, in which the cooling gas flow 44 is indicated. If the method according to the second embodiment is used to operate an adsorption device 16 with a separate pressure booster 18, as sketched in FIGS. 1 and 2, then a device, such as a radial fan, which can be controlled independently of the transportation of compressed air, is available with the pressure booster 18 for increasing the pressure. No compressed air is transported in the follow-up operating phase 203. However, the pressure booster 18 makes it possible to transport the air present in the adsorption device 16 and the pipelines 113, 114, 115 as a cooling gas flow 44 in the circuit through the operating region 102, the cooling region 119, the cooler 3 and the condensate separator 4. The flow path that the compressed air takes in the follow-up operating phase 203 whilst being transported in said circuit is denoted by the reference numeral 273 and shown as a dotted line in FIG. 2.

During or at the time of the initiation of the follow-up operating phase 203, the pressure booster 18 is set to a transportation capacity, for example a specific amount transported per unit time, which is suitable and sufficient for transporting the compressed air as a cooling gas flow 44. The transportation capacity can be regulated by controlling a speed of the pressure booster 18. For example, the adsorption chamber 11 can rotate by the follow-up angle at a relatively high speed, whilst the transportation capacity of the pressure booster 18 is reduced for the follow-up operating phase 203 with respect to the transportation capacity in the load operating phase 202 by reducing the speed.

The speed of the adsorption chamber 11 is preferably selected in stationary operation in such a way that the adsorption material 123 picks up no more than a specific amount of moisture to be picked up per passage through the operating region 102. Whilst the adsorption chamber 11 is stationary at the start of the transportation of compressed air in the warm-up operating phase 201, the "omitted" rotation, i.e. the rotation that the adsorption chamber 11 would have carried out in normal operation, is determined, in particular calculated, and stored, for example on the data storage device DSD of the control unit C2. When compressed air is transported for only a relatively short time, after the transportation of compressed air has stopped, the adsorption chamber 11 is rotated further by the "omitted" rotation. In this embodiment, the adsorption chamber 11 is then located in the position that it would have reached if the rotation of the adsorption chamber had started at the same time as the start of the transportation of compressed air.

It can thus be ensured that, even in the case of short transportation intervals and the associated frequent passages through the stationary adsorption chamber 11, the adsorption material 123 does not have to pick up any substantially greater amounts of moisture during the passage through the operating region 102 than in stationary operation. In addition, it can simultaneously be ensured that the portion of the adsorption material 123 which leaves the regeneration region 103 reaches the maximum possible temperature under the given conditions in the upper region 131 and is regenerated well.

Preferably, it is ensured that a sufficient amount of regeneration air flows through the adsorption material 123 in the regeneration region 103. For this purpose, the omitted rotation of the adsorption chamber 11 is preferably only made up for in so far as it is ensured that a minimum amount of regeneration air flows through the adsorption material 123. For this purpose, the mass flow in the regeneration gas flow 42 could be determined, e.g. measured, calculated or estimated, in particular for the load or warm-up operating phase which immediately precedes the interruption of the transportation of compressed air.

Figure 7A:
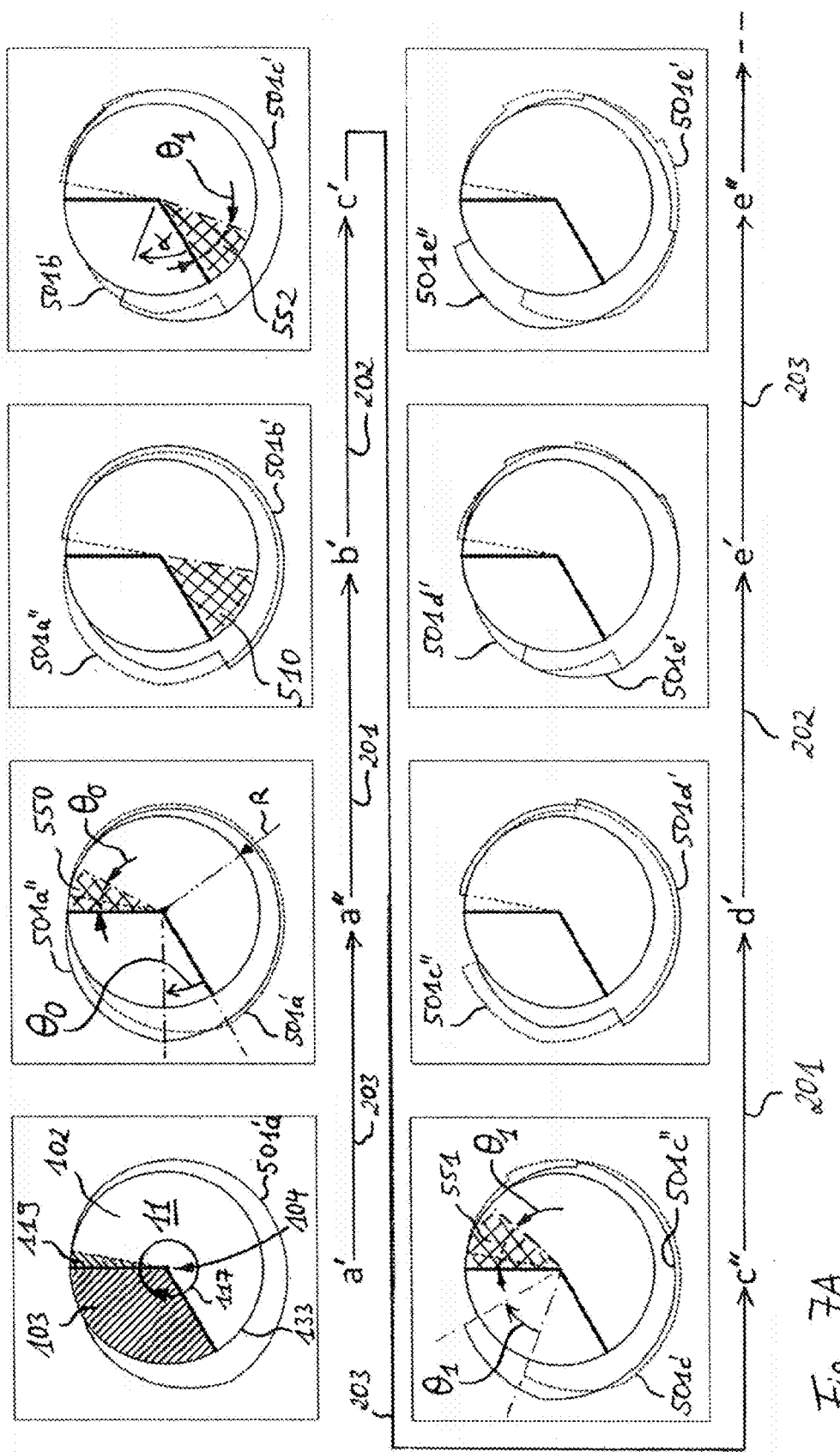
FIG. 7A.

The angle by which the adsorption chamber 11 is rotated further in the follow-up operating phase 203 is denoted in the following as follow-up angle $\theta$. In FIG. 7A, two examples $\theta_0$ and $\theta_1$ are indicated.

Operating data which can be taken into consideration (in each case in isolation or in a suitable combination) when determining the follow-up angle $\theta$, are for example as follows:
- the rotation omitted in the warm-up operating phase, as already mentioned;
- the geometric measurements of the three sectors, namely the angle $\delta$ defining the size of the operating region 102, the angle $\beta$ defining the size of the regeneration region 103, and the angle $\gamma$ defining the size of the cooling region 119;
- the duration of the warm-up operating phase 201 preceding the follow-up operating phase 203, i.e. the warm-up operating phase 201 which precedes the current follow-up operating phase 203, optionally with a load operating phase 202 in between;
- the duration of the load operating phase 202 which immediately precedes the follow-up operating phase 203 if such a load operating phase has been triggered, or an angle of the rotation carried out by the adsorption chamber 11 in said load operating phase 202;

the required amount of compressed air or the required compressed air mass flow during the preceding warm-up operating phase 201 and load operating phase 202;

the amount of regeneration air during the preceding warm-up operating phase 201 and load operating phase 202, i.e. the amount of air which flows through the regeneration region 103 with the regeneration gas flow 42, or the corresponding mass flow;

compressed air temperatures, in particular the drying inlet temperature, i.e. the temperature of the compressed air when it enters the operating region 102, during the preceding warm-up operating phase 201 and load operating phase 202;

the pressure of the compressed air to be dried during the preceding warm-up operating phase 201 and load operating phase 202;

the water concentration in the gas flow, in particular in the input gas flow 41 or in the output gas flow 43, for example during the preceding warm-up operating phase 201 and/or load operating phase 202;

the loading of the adsorption material 123;

the angles $\beta$, $\gamma$, $\delta$.

Preferably, the follow-up angle $\theta$ is limited to a value of $\theta \leq (2/3)\beta$. If necessary, earlier operating phases and the operating data therefrom can also be taken into consideration. Required operating data, in particular also water concentrations and loads, can be determined by means of the measuring device MD if required.

A follow-up angle $\theta$ of zero degrees which is determined in advance for example on the basis of a sufficient duration of the immediately preceding load operating phase 202 and/or of a sufficient angle of rotation can correspond to establishing that a follow-up operating phase 203 is not to be initiated and can thus be omitted in the case of the interruption of the transportation of the gas flow following said load operating phase 202.

The progression of the method according to the just described second embodiment of the invention will now be explained with reference to FIGS. 7A and 7B, which are to be examined in overview and in turn, in eleven partial pictures, show a sequence of operating modes a' to g' of the adsorption device 16. The partial pictures in FIGS. 7A and 7B are laid out in the same way as those in FIG. 5, so that in this regard, reference can be made to the embodiments above. In FIG. 7A, 7B, the loading of the adsorption material 123 is applied according to the same principle as in FIG. 5, but the loading progressions of the individual modes are denoted by the reference numerals 501a' to 501g'. As in FIG. 5, the rotation 117 always takes place in a clockwise direction in FIG. 7A, 7B as well.

In FIG. 7A, 7B, with respect to the transportation of compressed air, the same situation is present as is described in the case of FIG. 5, but the adsorption chamber 11 is controlled in conformance with the method according to the second embodiment of the present invention. The differences from the progression shown in FIG. 5 are explained below.

In the case of the progression in FIG. 7A, 7B, during the transition from the mode in partial picture a' to the mode in partial picture a", during the transition from the mode in partial picture c' to that in partial picture c", and during the transition from the mode in partial picture e' to that in partial picture e" in each case, in a respective follow-up operating phase 203, the adsorption chamber 11 rotates further by a follow-up angle $\theta$ when the transportation of compressed air is interrupted, in order to compensate for the increased amount of moisture picked up in the operating region 102 (drying sector) whilst the adsorption chamber 11 is stationary during the warm-up operating phase 201. Two follow-up angles are indicated by way of example as $\theta_0$ and $\theta_1$ in partial pictures a", c', c". The partial pictures a" and c" show the portion 550 or 551 of the adsorption material 123 which is moved out of the regeneration region 103 by the corresponding follow-up angle $\theta_0$ or $\theta_1$ in each case. The portion of the adsorption material 123 which is moved into the regeneration region 103 between partial picture b' and c' is denoted by reference numeral 510. During the follow-up of the adsorption chamber 11 in the follow-up operating phase 203 between partial pictures c' and c", a portion 552 is rotated out of the regeneration region 102 into the regeneration region 103 at the same time that the portion 551 is moved out of the regeneration region 103, the size of said rotated portion corresponding to the portion 551.

As can be seen from FIG. 5, partial picture g2, when the adsorption device 16 is operated according to the method according to the first embodiment, in the case of very intermittent operation where the transportation of compressed air is frequently interrupted and resumed, as illustrated in FIG. 5, the moisture content can be much higher than the preferred loading progression in stationary operation. A reason for this is that, in the sequence of modes in FIG. 5, the adsorption material 123 must dry substantially more compressed air as a result of the adsorption chamber being stationary in a circulation. However, overloading in the operating region 102 can lead to the drying capacity of the adsorption material 123 being reduced.

The method according to the second embodiment prevents this problem. The rotation which is carried out in the follow-up operating modes 203 between the modes in partial pictures c' and c", and e' and e" respectively, corresponds in this case to the rotation which the adsorption chamber 11 would have carried out between the start of each warm-up operating phase 201 and the actual start of the adsorption chamber—i.e. the end of the warm-up operating phase 201—if the rotation of the adsorption chamber had started at the same time that the transportation of compressed air was resumed. As a result, the amount of compressed air which the adsorption material 123 has to dry in a passage through the operating region 102 is close to the ideal state. As a result, the intermittent operation does not involve any substantial impairment of the drying capacity.

Even when, in the case of a short operating time of the input compressor 1, and thus only a brief transportation of compressed air as a result of the delayed start-up, the adsorption chamber 11 rotates by only a small angle or optionally also does not start rotating at all, the method is advantageous for the follow-up operating phases 203. Even if, when the transportation of compressed air is interrupted, the warm-up operating phase 201 is still not discontinued, the method can bring about further rotation of the adsorption chamber 11 in a follow-up operating phase 203. Even in the case of frequent interruptions of the transportation, the adsorption material 123 is thus moved through the regeneration region 103 bit by bit. The follow-up of the adsorption chamber 11 thus prevents the adsorption material 123 from being kept in the operating region 102 (drying sector) for too long before it is moved into the regeneration region 103. In this way, it is prevented that so much moisture flows through the adsorption material 123 that insufficient drying takes place, or even a breakthrough of moisture is prevented, in which the loading of the adsorption material 123, even in the upper region 131 of the adsorption chamber 11, is already so high in some regions that it is no longer possible to sufficiently dehumidify the compressed air.

As shown in FIG. 4, considerable desorption potential is also available during the warm-up operating phase 201. This is generally also the case in intermittent operation. By means of the follow-up operating phase 203, it can be ensured that, in the following next warm-up operating phase 201, the adsorption material 123 in the regeneration region 103 can be regenerated efficiently. In the mode shown in FIG. 5, partial picture c, a comparatively large part of the portion of the adsorption material 123 which is located in the regeneration region 103 contains only small amounts of moisture. The follow-up, as shown in FIG. 7, partial pictures c' and c", allows even better utilisation of the regeneration heat which is available in the regeneration region 103 in the warm-up operating phase 201, in that during the follow-up operating phase 203, heavily loaded adsorption material 123 in the portion 552 is moved into the regeneration region 103. This allows improved utilisation of the regeneration heat in the period in which it is automatically available as a result of the transportation of compressed air. It is not necessary to make additional efforts for regeneration during an interruption of the transportation of compressed air.

It is apparent that, for the embodiments explained above, the respective sizes of the portions 410, 510, 550, 551, owing to the cylindrical design of the rotatable adsorption chamber 11, when said sizes are considered as a volumetric region, depend on the height H of the adsorption chamber 11, the radius R thereof and the angle $\alpha$, $\beta$, $\gamma$, $\delta$, $\theta_0$ or $\theta_1$, over which each sector extends. Since, in the embodiments shown, the height H and the radius R of the adsorption chamber 11 are constant, the angle taken up in each case forms a measurement for the size of the associated region.

A control unit for controlling the adsorption device 16 can be implemented in the adsorption device 16 itself, as indicated in FIG. 1 by the reference numeral 14. Preferably, a control unit for controlling the adsorption device 16 is implemented in an input compressor control unit, which itself is preferably arranged in or at the input compressor 1 and, in FIG. 1, is provided with the reference numeral 13. However, it is of course also possible for a control unit of the adsorption device 16 to be provided in part or in full as an external control unit 15, or to cooperate with an external central control unit 15. Each of the control units 13, 14, 15 can be configured in conformance with the control unit C2 sketched schematically in FIG. 11.

In the case of an adsorption device 16 comprising a rotatable adsorption chamber 11, the operation of which has been described above, the axis of rotation 104 of the adsorption chamber 11 can be oriented vertically in a preferred variant shown in FIG. 1. In this case, the gas to be dried enters the regeneration region 103 from above, and the gas to be dried enters the operating region 102 from below. With respect to the upper and lower regions of the adsorption chamber 11, the wording used above relates to this configuration. However, in general, the ratios in each case can be precisely the opposite. It is also conceivable for the axis of rotation 104 of the adsorption chamber 11 to be oriented horizontally or in another direction. If it is provided that the gas to be dried will enter the regeneration region 103 from below, then measures will preferably be provided in an upper region to conduct off the condensate which accumulates during cooling during the standstill.

Figure 9:
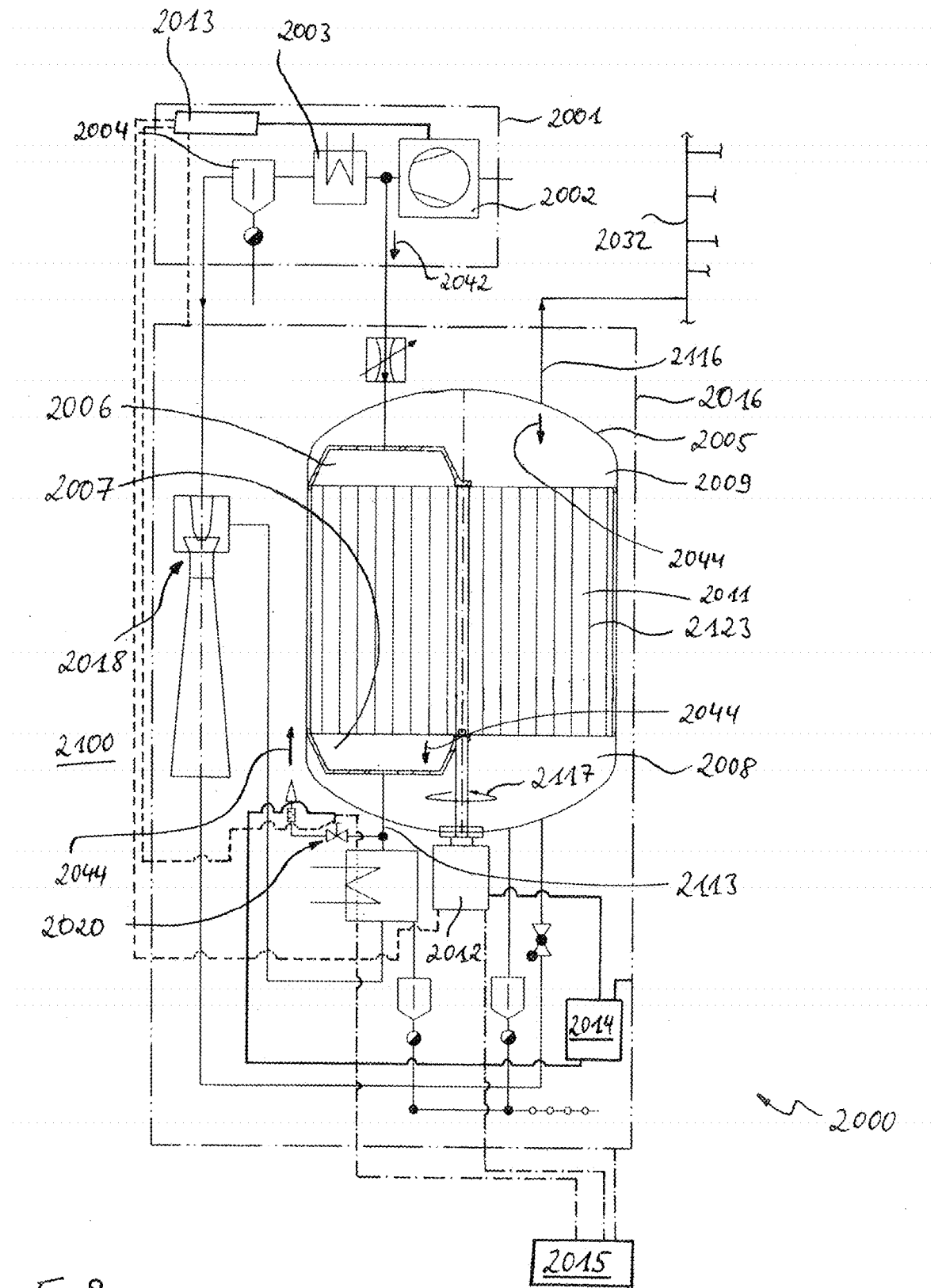
FIG. 9 is a schematic view of a system comprising an adsorption device, as is used in a method according to a variant of the second embodiment.

FIG. 9 shows a system 2000 comprising an input compressor 2001 and an adsorption device 2016, which can be operated according to a method according to a variant of the second embodiment. The input compressor 2001 comprises a compressor block 2002, a cooler 2003 and a condensate separator 2004. The adsorption device 2016, like the adsorption device 16, comprises an adsorption container 2005, in which an adsorption chamber 2011 having an adsorption material 2123 located therein is located. The adsorption chamber 2011 can be rotated in the adsorption container 2005 by means of a chamber drive 2012. As described in relation to FIGS. 1 and 2, during the rotational movement 2117 of the adsorption chamber 2011, the adsorption material 2123 is moved continuously through an operating region, a regeneration region and a cooling region. A regeneration inlet chamber 2006, a regeneration outlet chamber 2007, a drying inlet chamber 2008 and a drying outlet chamber 2009 are provided.

By contrast with the adsorption device 16 from FIG. 1, in FIG. 9, an ejector is provided as a pressure booster 2018. In this case, the regeneration takes place during the warm-up and load operating phase in the bypass flow by means of a regeneration gas flow 2042 which is branched off after the compressor block 2002. In this variant of the method according to the second embodiment, a cooling gas flow 2044 for cooling down the adsorption material 2123 during the follow-up operating phase 203 is generated by a controlled discharge of a relatively small amount of compressed air in the region of the output of the regeneration outlet chamber 2007. In this case, this relatively small amount of compressed air can come from a supply network 2032 which is connected to the adsorption device 2016 via the output line 2116 and, after flowing into the drying outlet chamber 2009, flowing through the adsorption material 2123 which is located in the cooling region, and flowing out of the regeneration outlet chamber 2007, can be discharged downstream of the regeneration outlet chamber 2007, out of the line 2113, into the atmosphere 2100. This discharge takes place by opening a controllable valve 2020, which can be for example a controllable solenoid valve. FIG. 9 illustrates the cooling gas flow 2044 for the follow-up operating phase 203.

A control unit for controlling the adsorption device 2016 can be implemented as a control unit 2014 in the adsorption device 2016. Preferably, the control of the adsorption device 2016 is implemented in an input compressor control unit 2013, which is arranged for example in or at the input compressor 2001. However, it is possible for a control unit of the adsorption device 2016 to be provided in part or in full as an external control unit 2015, or to cooperate with an external central control unit 2015. However, it is understood that in the case of different embodiments, one or all of the control units 2013, 2014, 2015 or a suitable combination of two of said units can be present. The control units 2013, 2014, 2015, like the control units 13, 14, 15, can each also be configured in conformance with the schematically shown control unit C2 from FIG. 11.

The control means C12, C13, C23, C31, C34, C41 shown in FIG. 11 and the evaluation means E of the control unit C2 in this case do not necessarily have to be formed from separate units, but rather the functions thereof can also be combined in one or more larger functional units. The control unit C2 can preferably be formed in such a way that the control means C12, C13, C23, C31, C34, C41 described in relation to FIG. 11 and the evaluation means E are implemented as routines, subroutines or otherwise functional components of a program which is coded in a suitable programming language and can be executed by means of a computing device, in particular using an integrated circuit such as a microprocessor, and stored for example in the control unit C2 on a suitable data storage device DSD.

Although the invention has been described in full above on the basis of preferred embodiments, it is not restricted to said embodiments, but rather can be modified in various ways.

The invention can also be useful for other applications than dehumidifying compressed air, in particular for removing other adsorbable components from a gas flow.

The invention is also not limited to an adsorption device having full flow regeneration, but rather can also be applied to adsorption devices in which the regeneration takes place in the bypass flow.

LIST OF REFERENCE SIGNS 1000, 2000 system
1, 2001 input compressor
2, 2002 compressor block
3, 2003 cooler
4, 2004 condensate separator
5, 2005 adsorption container
6, 2006 regeneration inlet chamber
7, 2007 regeneration outlet chamber
8, 2008 drying inlet chamber
9, 2009 drying outlet chamber
11, 2011 adsorption chamber
12, 2012 chamber drive
13, 2013 control unit (input compressor)
14, 2014 control unit (adsorption device)
15, 2015 external control unit
16, 2016 adsorption device
18, 2018 pressure booster
2020 controllable valve
32, 2032 supply network
41 input gas flow
42, 2042 regeneration gas flow
43 output gas flow
44, 2044 cooling gas flow
45 gas flow in the operating region
100, 2100 atmosphere
101 adsorption channel
102 operating region
103 regeneration region
104 axis of rotation
105 pipeline
106 first supply line
107 second discharge line
108 second supply line
109 first discharge line
111 first end (adsorption chamber)
112 second end (adsorption chamber)
113, 2113 pipeline
114 pipeline
115 pipeline
116, 2116 output line
117, 2117 rotational movement of the adsorption chamber
119 cooling region
123, 2123 adsorption material
131 upper region of the adsorption chamber
132 lower region of the adsorption chamber
133 perimeter of the adsorption chamber
201 warm-up operating phase
202 load operating phase
203 follow-up operating phase
204 operating intermission
212 arrow
213 arrow
214 arrow
223 arrow
224 arrow
231 arrow
234 arrow
241 arrow
243 arrow
273 flow path (cooling gas flow, follow-up operating phase)
301 achievable pressure dew point
302 inlet temperature of the regeneration air
303 desorption potential
304 arrow
401a loading of the adsorption material (mode a)
401b loading of the adsorption material (mode b)
401c loading of the adsorption material (mode c)
401d loading of the adsorption material (mode d)
401e loading of the adsorption material (mode e)
401f loading of the adsorption material (mode f)
401g loading of the adsorption material (mode g)
402 arrow
410 portion (adsorption material)
501a' loading of the adsorption material (mode a')
501a" loading of the adsorption material (mode a")
501b' loading of the adsorption material (mode b')
501c' loading of the adsorption material (mode c')
501c" loading of the adsorption material (mode c")
501d' loading of the adsorption material (mode d')
501e' loading of the adsorption material (mode e')
501e" loading of the adsorption material (mode e")
501f' loading of the adsorption material (mode f')
501g' loading of the adsorption material (mode g')
510 portion (adsorption material)
550 portion (adsorption material)
551 portion (adsorption material)
552 portion (adsorption material)
E evaluation means
D diameter (adsorption chamber)
DD detection device
H height (adsorption chamber)
MD measuring device
R radius (adsorption chamber)
C2 control unit
C12, C13, C23 control means
C31, C34, C41 control means
t time
α angle
β angle (regeneration region)
γ angle (cooling region)
δ angle (operating region)
θ angle
$\theta_0$, $\theta_1$ angle

The invention claimed is:

1. A method for operating an adsorption device to remove at least in part an adsorbable and/or condensable component from a gas flow, wherein the adsorption device contains an adsorption material and is configured in such a way that the adsorption material can be brought into contact with the gas flow in an operating region of the adsorption device in order to remove the component and the adsorption material can be regenerated in a regeneration region of the adsorption device by means of desorption of the component; and for this purpose, in a load operating phase of the adsorption device, consecutive portions of the adsorption material can be moved continuously through the operating region and the regeneration region relative to the operating region and the regeneration region in a recurring manner, wherein the method has the following method steps:

transporting the gas flow through the adsorption device in such a manner that the component is removed from the gas flow at least in part, and an output gas flow, from which the component is removed at least in part, is provided; and initiating a follow-up operating phase of the adsorption device, during which a portion of the adsorption material is moved out of the regeneration region by a movement relative to the regeneration region in the event of an at least temporary interruption or discontinuation of the transportation of the gas flow for providing the output gas flow.

2. The method according to claim 1, wherein the follow-up operating phase is initiated on the basis of operating data of the adsorption device which are associated with one or more operating phases and/or operating intermissions of the adsorption device and/or on the basis of operating data of a system in which the adsorption device is used and/or on the basis of a duration of one or more operating phases and/or operating intermissions of the adsorption device and/or on the basis of one or more predetermined parameters of the adsorption device and/or of the adsorption material.

3. The method according to claim 1, wherein the follow-up operating phase is initiated immediately after the at least temporary interruption or discontinuation of the transportation of the gas flow for providing the output gas flow.

4. The method according to claim 1, wherein in the regeneration region, none or substantially none of the adsorption material is regenerated whilst the transportation of the gas flow for providing the output gas flow is at least temporarily interrupted or discontinued.

5. The method according to claim 1, wherein the adsorption device is configured in such a way that, relative to an environment in which the adsorption device is operated, the operating region and the regeneration region are designed to be stationary and the adsorption material is designed to be movable.

6. The method according to claim 1, wherein, during the transportation of the gas flow for providing the output gas flow, the gas flow is compressed by an input compressor which is connected upstream of the adsorption device on the input side.

7. The method according to claim 1, wherein, during the transportation of the gas flow for providing the output gas flow, the regeneration takes place in that a regeneration gas flow is brought into contact with the adsorption material in the regeneration region.

8. The method according to claim 7, wherein, during the transportation of the gas flow for providing the output gas flow, a full flow regeneration of the adsorption material takes place, and in that for this purpose, the gas flow as a full flow forms the regeneration gas flow, the regeneration gas flow, after leaving the regeneration region, is supplied to the operating region separately or together with another gas flow and comes into contact with the adsorption material there for the removal of the component at least in part.

9. The method according to claim 7, wherein during the transportation of the gas flow for providing the output gas flow, the regeneration gas flow, after it has left the regeneration region and before it enters the operating region, is cooled separately or together with another gas flow by means of a cooler, and at least part of the component is condensed and separated as a condensate.

10. The method according to claim 7, wherein the pressure of the regeneration gas flow, separately or together with another gas flow, is increased by means of a pressure booster before the regeneration gas flow enters the operating region.

11. The method according to claim 1, wherein when the transportation of the gas flow for providing the output gas flow is started or resumed, the adsorption device is firstly operated in a warm-up operating phase, during which the gas flow for providing the output gas flow is transported, and the adsorption material is stationary relative to the operating region and the regeneration region.

12. The method according to claim 11, wherein, after the warm-up operating phase, a load operating phase is initiated, during which consecutive portions of the adsorption material are moved continuously through the operating region and the regeneration region relative to the operating region and the regeneration region in a recurring manner.

13. The method according to claim 12, wherein the duration of the warm-up operating phase, taken from the start or the resumption of the transportation of the gas flow for providing the output gas flow until the initiation of the load operating phase, is variable.

14. The method according to claim 12, wherein the duration of the warm-up operating phase, taken from the start or the resumption of the transportation of the gas flow for providing the output gas flow until the initiation of the load operating phase, taking into consideration operating data of the adsorption device which are associated with a current operating phase and/or a previous operating phase and/or operating intermission or a plurality of previous operating phases and/or operating intermissions of the adsorption device and/or taking into consideration operating data of a system in which the adsorption device is used and/or taking into consideration a duration of one or more previous operating phases and/or operating intermissions of the adsorption device and/or taking into consideration one or more predetermined parameters of the adsorption device and/or of the adsorption material.

15. The method according to claim 1, wherein, in addition to the operating region and the regeneration region, a cooling region is provided, and the adsorption device is configured in such a way that adsorption material regenerated in the load operating phase, after being moved out of the regeneration region and before being moved back into the operating region, can be cooled down to a temperature which is suitable for the removal of the component at least in part out of the gas flow, during the follow-up operating phase, the portion of the adsorption material which is moved out of the regeneration region during the follow-up operating phase being moved into the cooling region by a movement of the adsorption material relative to the cooling region and/or moved through the cooling region at least in part and cooled there.

16. The method according to claim 15, wherein the cooling in the follow-up operating phase takes place in that during the follow-up operating phase, a cooling gas flow is brought about by means of a controllable device which is independent of the transportation of the gas flow for providing the output gas flow, the cooling gas flow being brought into contact with the adsorption material in the cooling region for the cooling of said material.

17. The method according to claim 16, wherein during the transportation of the gas flow for providing the output gas flow, the regeneration takes place in that a regeneration gas flow is brought into contact with the adsorption material in the regeneration region, wherein the pressure of the regeneration gas flow, separately or together with another gas flow, is increased by means of a pressure booster before the regeneration gas flow enters the operating region, wherein the pressure booster forms the controllable device, and in that the cooling gas flow is brought about during the follow-up operating phase by means of the pressure booster.

18. The method according to claim 1, wherein a size of the portion of the adsorption material which is moved out of the regeneration region during the follow-up operating phase is no more than two thirds of a size of the regeneration region.

19. The method according to claim 1, wherein a duration of the follow-up operating phase and/or a size of the portion of the adsorption material which is to be moved out of the regeneration region during the follow-up operating phase is non-adjustable or is determined on the basis of operating data of the adsorption device which are associated with one or more operating phases and/or operating intermissions of the adsorption device and/or
- on the basis of operating data of a system in which the adsorption device is used and/or
- on the basis of the duration of one or more operating phases and/or operating intermissions of the adsorption device and/or
- on the basis of one or more predetermined parameters of the adsorption device and/or of the adsorption material.

20. The method according to claim 11, wherein a duration of the follow-up phase and/or a size of the portion of the adsorption material which is to be moved out of the regeneration region in the follow-up operating phase is determined; and wherein, when determining the duration of the follow-up operating phase and/or the size of the portion of the adsorption material which is to be moved out of the regeneration region in the follow-up operating phase, a measurement for the movement which the adsorption material would have carried out relative to the operating region and the regeneration region during the duration of the warm-up operating phase if the adsorption device had been operated in a load operating phase instead of in the warm-up operating phase, is taken into consideration.

21. A control unit which is configured to control an adsorption device to remove an adsorbable and/or condensable component at least in part from a gas flow, wherein the adsorption device to be controlled contains an adsorption material and is configured in such a way that the adsorption material can be brought into contact with the gas flow in an operating region of the adsorption device in order to remove the component and the adsorption material can be regenerated in a regeneration region of the adsorption device by means of desorption of the component, and for this purpose, in a load operating phase of the adsorption device, consecutive portions of the adsorption material can be moved continuously through the operating region and the regeneration region relative to the operating region and the regeneration region in a recurring manner; the control unit comprising control means for initiating a follow-up operating phase of the adsorption device and for controlling the adsorption device in such a way that, during the follow-up operating phase, a portion of the adsorption material is moved out of the regeneration region by a movement relative to the regeneration region if a transportation of the gas flow through the adsorption device, such that the component is removed at least in part from the gas flow, and an output gas flow, from which the component is removed at least in part, is provided, is at least temporarily interrupted or discontinued.

22. The control unit according to claim 21, wherein the control unit is configured to control the adsorption device for an operation according to claim 1.

23. The method according to claim 1, wherein the follow-up operating phase is initiated with a delay between the time of the at least temporary interruption or discontinuation of the transportation of the gas flow for providing the output gas flow and the time of the initiation of the follow-up operating phase.

24. The method according to claim 23, wherein the delay has a duration of at most about ten minutes.

25. The method according to claim 23, wherein the delay has a duration of at most about five minutes.

26. The method according to claim 10, wherein the pressure booster is in the form of a compressor, a fan, or a pump.

27. The method according to claim 16, wherein the cooling gas flow is brought about by means of a compressor, a fan, a pump, or a controllable valve.

28. The method according to claim 17, wherein the pressure booster is in the form of a compressor, a fan, or a pump.

29. The method according to claim 17, wherein a capacity of the pressure booster at the initiation of the follow-up operating phase or during the follow-up operating phase is set to a measurement which is suitable for bringing about a sufficient cooling gas flow.

30. The method according to claim 29, wherein the capacity of the pressure booster at the initiation of the follow-up operating phase or during the follow-up operating phase is reduced with respect to the capacity in the previous load operating phase.

31. The method according to claim 20, wherein the measurement for the movement which the adsorption material would have carried out relative to the operating region and the regeneration region during the duration of the warm-up operating phase if the adsorption device had been operated in a load operating phase instead of in the warm-up operating phase is a measurement for the movement which the adsorption material would have carried out relative to the operating region and the regeneration region during the duration of the last warm-up operating phase prior to the follow-up operating phase if the adsorption device had been operated in a load operating phase instead of in the warm-up operating phase.

* * * * *

(12) EX PARTE REEXAMINATION CERTIFICATE (12554th)
United States Patent
Fredenhagen

(10) Number: US 9,943,803 C1
(45) Certificate Issued: Mar. 25, 2024

(54) METHOD FOR OPERATING AN ADSORPTION DEVICE AND A CONTROL UNIT

(71) Applicant: KAESER KOMPRESSOREN SE, Coburg (DE)

(72) Inventor: Andreas Fredenhagen, Coburg (DE)

(73) Assignee: KAESER KOMPRESSOREN SE, Coburg (DE)

Reexamination Request:
No. 90/015,206, Mar. 3, 2023

Reexamination Certificate for:
Patent No.: 9,943,803
Issued: Apr. 17, 2018
Appl. No.: 14/917,700
PCT Filed: Sep. 4, 2014
PCT No.: PCT/EP2014/068845
§ 371 (c)(1),
(2) Date: Mar. 9, 2016
PCT Pub. No.: WO2015/032862
PCT Pub. Date: Mar. 12, 2015

(30) Foreign Application Priority Data

Sep. 9, 2013 (EP) ..................................... 13183511

(51) Int. Cl.
*B01D 53/06* (2006.01)
*B01D 53/04* (2006.01)
*B01D 53/26* (2006.01)

(52) U.S. Cl.
CPC ....... *B01D 53/261* (2013.01); *B01D 53/0454* (2013.01); *B01D 53/06* (2013.01); *B01D 2257/80* (2013.01); *B01D 2259/40086* (2013.01)

(58) Field of Classification Search
None
See application file for complete search history.

(56) References Cited

To view the complete listing of prior art documents cited during the proceeding for Reexamination Control Number 90/015,206, please refer to the USPTO's Patent Electronic System.

*Primary Examiner* — Leonardo Andujar

(57) ABSTRACT

In a method for operating an adsorption device to remove at least in part an adsorbable and/or condensable component from a gas flow. The adsorption device contains an adsorption material and is configured in such a way that the adsorption material is brought into contact with the gas flow in an operating region and can be regenerated in a regeneration region. In the case of an at least temporary interruption or discontinuation of transportation of the gas flow to provide an output gas flow, a follow-up operating phase is initiated, during which a portion of the adsorption material is moved out of the regeneration region.

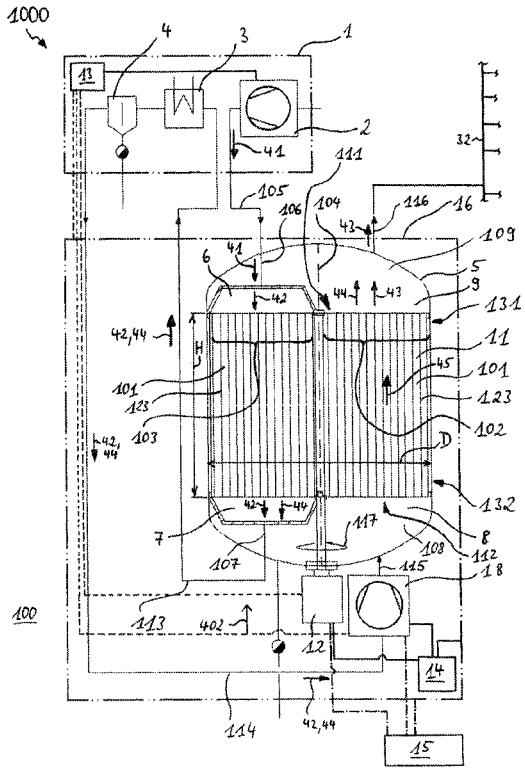

1

EX PARTE
REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 4, 6-9, 11, 15, 18, 21, 22 and 23 are determined to be patentable as amended.

Claims 2, 5, 10, 12-14, 16, 17, 19, 20 and 24-31, dependent on an amended claim, are determined to be patentable.

New claims 32-39 are added and determined to be patentable.

1. A method for operating an adsorption device to remove at least in part an adsorbable and/or condensable component from a gas flow, wherein the adsorption device contains an adsorption material and is configured in such a way that the adsorption material can be brought into contact with the gas flow in an operating region of the adsorption device in order to remove the component and the adsorption material can be regenerated in a regeneration region of the adsorption device by means of desorption of the component; and for this purpose, in a load operating phase of the adsorption device, consecutive portions of the adsorption material can be moved continuously through the operating region and the regeneration region relative to the operating region and the regeneration region in a recurring manner, wherein the method has the following method steps:
    transporting the gas flow through the adsorption device[in such a manner that], *including removing* the component [is removed] from the gas flow at least in part [, and an output] *with the adsorption device; outputting the* gas flow[,] from which the component [is] *has been* removed at least in part [, is provided] *from the adsorption device*; and
    initiating a follow-up operating phase of the adsorption device *in response to a temporary interruption of the gas flow that includes stopping transporting the gas flow through the adsorption device and stopping outputting the gas flow from the adsorption device*, [during which]
    *wherein the follow-up operating phase includes, while the gas flow is stopped, moving* a portion of the adsorption material [is moved] out of the regeneration region by a movement relative to the regeneration region[in the event of an at least temporary interruption or discontinuation of the transportation of the gas flow for providing the output gas flow].

3. The method according to claim 1, wherein *transporting the gas flow through the adsorption device and outputting the gas flow from the adsorption device are continuous and recurring steps in an operating mode of the adsorption device, and* the follow-up operating phase is initiated [immediately] after [the at least temporary interruption or discontinuation of the transportation of] *the temporary interruption of* the gas flow [for providing the output gas flow] *in a further step of the same operating mode, the method further comprising, after the follow-up operating phase:*
    *initiating a stop operating phase to terminate the operating mode, including stopping the follow-up operating phase.*

4. The method according to claim 1, wherein in the regeneration region, none or substantially none of the adsorption material is regenerated whilst the transportation of the gas flow [for providing the output gas flow is at least temporarily interrupted or discontinued] *is stopped*.

6. The method according to claim 1, [wherein, during the transportation of the gas flow for providing the output gas flow,] *further comprising:*
    *operating a compressor and outputting the gas flow from the compressor to the adsorption device, including compressing* the gas flow [is compressed by an input] with the compressor which is connected upstream of the adsorption device on [the] *an* input side.

7. The method according to claim 1, wherein, during the transportation of the gas flow *through the adsorption device for providing the output gas flow from the adsorption device*, the regeneration takes place in that a regeneration gas flow is brought into contact with the adsorption material in the regeneration region.

8. The method according to claim 7, wherein, during the transportation of the gas flow *through the adsorption device for providing the output gas flow from the adsorption device*, a full flow regeneration of the adsorption material takes place, and in that for this purpose, the gas flow as a full flow forms the regeneration gas flow, the regeneration gas flow, after leaving the regeneration region, is supplied to the operating region separately or together with another gas flow and comes into contact with the adsorption material there for the removal of the component at least in part.

9. The method according to claim 7, wherein during the transportation of the gas flow *through the adsorption device for providing the output gas flow from the adsorption device*, the regeneration gas flow, after it has left the regeneration region and before it enters the operating region, is cooled separately or together with another gas flow by means of a cooler, and at least part of the component is condensed and separated as a condensate.

11. [The method according to claim 1.] *A method for operating an adsorption device to remove at least in part an adsorbable and/or condensable component from a gas flow, wherein the adsorption device contains an adsorption material and is configured in such a way that the adsorption material can be brought into contact with the gas flow in an operating region of the adsorption device in order to remove the component and the adsorption material can be regenerated in a regeneration region of the adsorption device by means of desorption of the component and for this purpose, in a load operating phase of the adsorption device, consecutive portions of the adsorption material can be moved continuously through the operating region and the regeneration region relative to the operating region and the regeneration region in a recurring manner, wherein the method has the following method steps:*
    *transporting the gas flow through the adsorption device in such a manner that the component is removed from the gas flow at least in part, and an output gas flow, from which the component is removed at least in part, is provided; and*
    *initiating a follow-up operating phase of the adsorption device, during which a portion of the adsorption material is moved out of the regeneration region by a movement relative to the regeneration region in the event of an at least temporary interruption or discon-* tinuation of the transportation of the gas flow for providing the output gas flow, wherein when the transportation of the gas flow for providing the output gas flow is started or resumed, the adsorption device is firstly operated in a warm-up operating phase, during which the gas flow for providing the output gas flow is transported, and the adsorption material is stationary relative to the operating region and the regeneration region.

15. [The method according to claim 1] *A method for operating an adsorption device to remove at least in part an adsorbable and/or condensable component from a gas flow, wherein the adsorption device contains an adsorption material and is configured in such a way that the adsorption material can be brought into contact with the gas flow in an operating region of the adsorption device in order to remove the component and the adsorption material can be regenerated in a regeneration region of the adsorption device by means of desorption of the component and for this purpose, in a load operating phase of the adsorption device, consecutive portions of the adsorption material can be moved continuously through the operating region and the regeneration region relative to the operating region and the regeneration region in a recurring manner, wherein the method has the following method steps:*

*transporting the gas flow through the adsorption device in such a manner that the component is removed from the gas flow at least in part, and an output gas flow, from which the component is removed at least in part, is provided; and*

*initiating a follow-up operating phase of the adsorption device, during which a portion of the adsorption material is moved out of the regeneration region by a movement relative to the regeneration region in the event of an at least temporary interruption or discontinuation of the transportation of the gas flow for providing the output gas flow,* wherein, in addition to the operating region and the regeneration region, a cooling region is provided, and the adsorption device is configured in such a way that adsorption material regenerated in the load operating phase, after being moved out of the regeneration region and before being moved back into the operating region, can be cooled down to a temperature which is suitable for the removal of the component at least in part out of the gas flow, during the follow-up operating phase, the portion of the adsorption material which is moved out of the regeneration region during the follow-up operating phase being moved into the cooling region by a movement of the adsorption material relative to the cooling region and/or moved through the cooling region at least in part and cooled there.

18. [The method according to claim 1] *A method for operating an adsorption device to remove at least in part an adsorbable and/or condensable component from a gas flow, wherein the adsorption device contains an adsorption material and is configured in such a way that the adsorption material can be brought into contact with the gas flow in an operating region of the adsorption device in order to remove the component and the adsorption material can be regenerated in a regeneration region of the adsorption device by means of desorption of the component and for this purpose, in a load operating phase of the adsorption device, consecutive portions of the adsorption material can be moved continuously through the operating region and the regeneration region relative to the operating region and the regeneration region in a recurring manner, wherein the method has the following method steps:*

*transporting the gas flow through the adsorption device in such a manner that the component is removed from the gas flow at least in part, and an output gas flow, from which the component is removed at least in part, is provided; and*

*initiating a follow-up operating phase of the adsorption device, during which a portion of the adsorption material is moved out of the regeneration region by a movement relative to the regeneration region in the event of an at least temporary interruption or discontinuation of the transportation of the gas flow for providing the output gas flow,* wherein a size of the portion of the adsorption material which is moved out of the regeneration region during the follow-up operating phase is no more than two thirds of a size of the regeneration region.

21. A *device, comprising:*

*a compressor configured to receive a gas flow and output a compressed gas flow;*

*an adsorption device in fluid communication with the compressor, the adsorption chamber including a regeneration region and an operating region, the adsorption device configured to receive the compressed gas flow and output a dried compressed gas flow;*

*an adsorption material in the adsorption chamber; and*

*a* control unit [which] *in communication with the adsorption device and the compressor, wherein in a load operating phase of the adsorption device, the control unit* is configured to control [an] *the* adsorption device *to:* remove an adsorbable and/or condensable component at least in part from [a] *the compressed* gas flow[, wherein] *through* the adsorption device [to be controlled contains an adsorption material and is configured in such a way that] *via contact between* the adsorption material [can be brought into contact with] *and* the *compressed* gas flow in an operating region of the adsorption device[in order to remove the component and];

*regenerate* the adsorption material [can be regenerated] in a regeneration region of the adsorption device by [means of] desorption of the component[, and for this purpose, in a load operating phase of the adsorption device,]; *and*

*move* consecutive portions of the adsorption material [can be moved] continuously through the operating region and the regeneration region relative to the operating region and the regeneration region in a recurring manner[; the control unit comprising control means for initiating], *and wherein, in response to a temporary stoppage of the compressed gas flow through the adsorption chamber, and while the gas flow is stopped, the control unit is further configured to:*

*initiate* a follow-up operating phase of the adsorption device[and for controlling the adsorption device in such a way that,] *wherein* during the follow-up operating phase, *the control unit provides instructions to move* a portion of the adsorption material [is moved] out of the regeneration region by a movement relative to the regeneration region[if a transportation of the gas flow through the adsorption device, such that the component is removed at least in part from the gas flow, and an output gas flow, from which the component is removed at least in part, is provided, is at least temporarily interrupted or discontinued].

22. The [control unit] *device* according to claim 21, wherein the control unit is configured to control the adsorption device for an operation according to claim 1.

23. The method according to claim 1, wherein the follow-up operating phase is initiated with a delay between the time of the [at least] temporary interruption [or discontinuation of the transportation] of the gas flow [for providing the output gas flow] and the time of the initiation of the follow-up operating phase.

32. A method, comprising:
performing a load operating phase of an adsorption device that includes:
transporting a gas flow through the adsorption device;
desorbing water from an adsorption material in a regeneration region of the adsorption device into the gas flow to regenerate a portion of the adsorption material;
moving the regenerated portion of the adsorption material from the regeneration region to an operating region of the adsorption device;
removing water from the gas flow in the operating region of the adsorption device, including adsorbing water from the gas flow into the regenerated portion of the adsorption material to hydrate the portion of the adsorption material;
moving the hydrated portion of the adsorption material from the operating region to the regeneration region; and
outputting dried gas from the adsorption device after removing the water; and
performing a follow-up operating phase in response to, and after, a temporary interruption of the gas flow that includes stopping transporting the gas flow and stopping outputting the dried gas, wherein the follow-up operating phase includes:
moving the regenerated portion of the adsorption material out of the regeneration region; and
cooling the regenerated portion of the adsorption material in a cooling region of the adsorption device located between the operating region and the regeneration region, including transporting a cooling gas flow through the operating region, the cooling region, and a cooler via a pressure booster in fluid communication with the adsorption device and the cooler.

33. *The method of claim 32, wherein cooling the regenerated portion of the adsorption material includes cooling the regenerated portion of the material with the cooling gas in a loop including the operating region, the cooling region, the cooler, and the pressure booster.*

34. *The method of claim 32, wherein cooling the regenerated portion of the adsorption material includes cooling the regenerated portion of the adsorption material after moving the regenerated portion out of the regeneration region during the follow-up operating phase and before moving the regenerated portion to the operating region during the follow-up operating phase or a subsequent load operating phase.*

35. *A method, comprising:*
*performing a load operating phase of an adsorption device that includes:*
*transporting a gas flow through an adsorption device;*
*desorbing water from an adsorption material in a regeneration region of the adsorption device into the gas flow to regenerate a portion of the adsorption material;*
*moving the regenerated portion of the adsorption material from the regeneration region to an operating region of the adsorption device;*
*removing water from the gas flow in the operating region of the adsorption device, including adsorbing water from the gas flow into the regenerated portion of the adsorption material to degenerate the portion of the adsorption material;*
*moving the degenerated portion of the adsorption material from the operating region to the regeneration region;*
*outputting dried gas from the adsorption device after transporting the gas flow and after removing the water; and*
*performing a follow-up operating phase in response to, and after, a temporary interruption of the gas flow that includes stopping transporting the gas flow and stopping outputting the dried gas, wherein the follow-up operating phase includes:*
*moving the regenerated portion of the adsorption material out of the regeneration region, wherein the regenerated portion of the adsorption material moved out of the regeneration region is less than an entirety of the adsorption material in the regeneration region.*

36. *The method of claim 35, wherein moving the regenerated portion of the adsorption material out of the regeneration region includes:*
*determining a follow-up angle of rotation of the adsorption material during the follow-up operating phase that corresponds to the regenerated portion of the adsorption material moved out of the regeneration region during the follow-up operating phase, wherein determining the follow-up angle includes considering operating data, the operating data including at least one of:*
*a rotation omitted in a warm-up operating phase preceding the load operating phase or preceding the follow-up operating phase;*
*geometric measurements of the regeneration region and the operating region, and optionally of a cooling region between the regeneration region and the operating region;*
*a duration of the preceding warm-up operating phase;*
*a duration of the load operating phase preceding the follow-up operating phase;*
*an amount of the gas flow or a compressed gas mass flow during the preceding warm-up operating phase and the preceding load operating phase;*
*an amount of regeneration gas flow during the preceding warm-up operating phase and the preceding load operating phase;*
*a temperature of the gas flow;*
*a pressure of the gas flow; and*
*a water concentration in the gas flow; and*
*rotating the adsorption material by the follow-up operating angle during the follow-up operating phase to move the regenerated portion of the adsorption material out of the regeneration region.*

37. *A system, comprising:*
*a compressor configured to receive a gas flow and output a compressed gas flow;*
*an adsorption chamber in fluid communication with the compressor, the adsorption chamber including a regeneration region and an operating region, the adsorption chamber configured to receive the compressed gas flow and output a dried compressed gas flow; and*
*an adsorption material in the adsorption chamber,* wherein in an operating phase of the adsorption device:
the compressed gas flow from the compressor is configured to flow through the adsorption chamber in contact with the adsorption material in the regeneration region to desorb water from the adsorption material and regenerate a portion of the adsorption material;
at least one of the adsorption chamber and the adsorption material are configured to move the regenerated portion of the adsorption material from the regeneration region to the operating region;
the compressed gas flow from the compressor is configured to flow through the adsorption chamber in contact with the regenerated portion of the adsorption material in the operating region to adsorb water from the compressed gas flow into the regenerated portion of the adsorption material and hydrate the portion of the adsorption material;
at least one of the adsorption chamber and the adsorption material are configured to move the hydrated portion of the adsorption material from the regeneration region to the operating region in a recurring cycle; and in response to a temporary stoppage of the compressed gas flow through the adsorption chamber, and while the gas flow is stopped, at least one of the adsorption chamber and the adsorption material are configured to move the regenerated portion of the adsorption material out of the regeneration region in a follow-up operating phase.

38. The system of claim 37, wherein the adsorption device further includes a cooling region between the regeneration region and the operating region, and wherein the adsorption device is configured to cool the regenerated portion of the adsorption material in the cooling region after the regenerated material is moved out of the regeneration region in the follow-up operating phase.

39. The system of claim 37, wherein the regenerated portion of the adsorption material moved out of the regeneration region in the follow-up operating phase is less than an entirety of the adsorption material in the regeneration region.

* * * * *